US011233471B2

(12) United States Patent
Suzuki et al.

(10) Patent No.: US 11,233,471 B2
(45) Date of Patent: Jan. 25, 2022

(54) MOTOR CONTROL DEVICE, IMAGE FORMING APPARATUS, AND METHOD FOR ESTIMATING INITIAL POSITION OF MAGNETIC POLE OF ROTOR

(71) Applicant: KONICA MINOLTA, INC., Tokyo (JP)

(72) Inventors: Daichi Suzuki, Toyokawa (JP); Yuji Kobayashi, Toyohashi (JP); Kazumichi Yoshida, Toyokawa (JP); Harumitsu Fujimori, Toyokawa (JP); Yuta Tachibana, Toyokawa (JP); Hiroyuki Yoshikawa, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 108 days.

(21) Appl. No.: 16/737,093

(22) Filed: Jan. 8, 2020

(65) Prior Publication Data
US 2020/0235683 A1  Jul. 23, 2020

(30) Foreign Application Priority Data

Jan. 18, 2019  (JP) .............................. JP2019-006789

(51) Int. Cl.
*H02P 6/185*  (2016.01)
*H02P 21/18*  (2016.01)
(Continued)

(52) U.S. Cl.
CPC ......... *H02P 6/185* (2013.01); *G03G 15/5008* (2013.01); *H02P 6/06* (2013.01);
(Continued)

(58) Field of Classification Search
CPC .... H02P 8/10; H02P 21/32; H02P 8/08; H02P 6/185; H02P 6/186; H02P 6/15;
(Continued)

(56) References Cited

U.S. PATENT DOCUMENTS 4,876,491 A    10/1989  Squires et al.
9,201,361 B2   12/2015  Fujimori
(Continued)

FOREIGN PATENT DOCUMENTS

JP         2547778 B2    10/1996
JP       2013172511 A     9/2013

OTHER PUBLICATIONS

U.S. Appl. No. 16/794,043; First Named Inventor: Hiroyuki Yoshikawa; Title: "Motor Control Device, Method of Estimating Initial Position of Magnetic Pole of Rotor, and Image Forming Apparatus"; Filed: Feb. 18, 2020.

*Primary Examiner* — Bickey Dhakal
(74) *Attorney, Agent, or Firm* — Holtz, Holtz & Volek PC

(57) ABSTRACT

A control circuit of a motor control device estimates an initial magnetic pole position of a rotor using an inductive sensing scheme. When estimating the initial magnetic pole position, a drive circuit applies a voltage to a stator winding at each of L electrical angles (L≥5) while changing the L electrical angles. An absolute value of an electrical angle difference of the voltage applied to the stator winding between an i-th time (2≤i≤L) and an i−1st time is 180−360/L degrees or more and 180+360/L degrees or less. An absolute value of an electrical angle difference of the voltage applied to the stator winding between a 1st time for initial position estimation and a last time before starting initial position estimation is 180−360/L degrees or more and 180+360/L degrees or less.

20 Claims, 26 Drawing Sheets

(51) Int. Cl.
*G03G 15/00* (2006.01)
*H02P 6/15* (2016.01)
*H02P 6/06* (2006.01)
*H02P 6/08* (2016.01)
*H02P 6/22* (2006.01)
*H02P 6/28* (2016.01)
*H02P 27/08* (2006.01)
*H02P 6/17* (2016.01)

(52) U.S. Cl.
CPC .................. *H02P 6/08* (2013.01); *H02P 6/15* (2016.02); *H02P 6/17* (2016.02); *H02P 6/22* (2013.01); *H02P 6/28* (2016.02); *H02P 21/18* (2016.02); *H02P 27/08* (2013.01); *H02P 2203/01* (2013.01)

(58) Field of Classification Search
CPC ...... H02P 6/06; H02P 6/08; H02P 6/28; H02P 21/18; H02P 27/08; H02P 6/17; H02P 2203/01; H02P 21/28; H02P 21/34; H02P 6/085; H02P 2203/03; H02P 25/089; H02P 21/00; G03G 15/5008; H04N 1/00912
See application file for complete search history.

(56) References Cited

U.S. PATENT DOCUMENTS

| | | |
|---|---|---|
| 10,141,878 B2 | 11/2018 | Suzuki et al. |
| 2017/0170767 A1* | 6/2017 | Yoshiya .................... H02P 6/20 |
| 2018/0083558 A1* | 3/2018 | Takai ....................... H02P 6/185 |
| 2018/0144484 A1 | 5/2018 | Kato et al. |
| 2018/0167009 A1* | 6/2018 | Suzuki .................... H02P 21/34 |
| 2019/0367093 A1* | 12/2019 | Suzuki .................... G01D 3/08 |

* cited by examiner

FIG.9

| NO. | ENERGIZATION ANGLE $\theta_M$ [DEGREE] | VOLTAGE COMMAND VALUE | | | $\theta_M[i]-\theta_M[i-1]$ |
|---|---|---|---|---|---|
| | | Vu* | Vv* | Vw* | |
| 1 | 0 | 1.00 | -0.50 | -0.50 | |
| 2 | 30 | 0.87 | 0.00 | -0.87 | 30 |
| 3 | 60 | 0.50 | 0.50 | -1.00 | 30 |
| 4 | 90 | 0.00 | 0.87 | -0.87 | 30 |
| 5 | 120 | -0.50 | 1.00 | -0.50 | 30 |
| 6 | 150 | -0.87 | 0.87 | 0.00 | 30 |
| 7 | 180 | -1.00 | 0.50 | 0.50 | 30 |
| 8 | 210 | -0.87 | 0.00 | 0.87 | 30 |
| 9 | 240 | -0.50 | -0.50 | 1.00 | 30 |
| 10 | 270 | 0.00 | -0.87 | 0.87 | 30 |
| 11 | 300 | 0.50 | -1.00 | 0.50 | 30 |
| 12 | 330 | 0.87 | -0.87 | 0.00 | 30 |

FIG.10A

BASIC ENERGIZATION PATTERN

| NO. | ENERGIZATION ANGLE $\theta_M$ [DEGREE] | VOLTAGE COMMAND VALUE | | | $\theta_M[i] - \theta_M[i-1]$ (mod 360) |
|---|---|---|---|---|---|
| | | Vu* | Vv* | Vw* | |
| 1 | 0 | 1.00 | -0.50 | -0.50 | |
| 2 | 180 | -1.00 | 0.50 | 0.50 | 180 |
| 3 | 30 | 0.87 | 0.00 | -0.87 | 210 |
| 4 | 210 | -0.87 | 0.00 | 0.87 | 180 |
| 5 | 60 | 0.50 | 0.50 | -1.00 | 210 |
| 6 | 240 | -0.50 | -0.50 | 1.00 | 180 |
| 7 | 90 | 0.00 | 0.87 | -0.87 | 210 |
| 8 | 270 | 0.00 | -0.87 | 0.87 | 180 |
| 9 | 120 | -0.50 | 1.00 | -0.50 | 210 |
| 10 | 300 | 0.50 | -1.00 | 0.50 | 180 |
| 11 | 150 | -0.87 | 0.87 | 0.00 | 210 |
| 12 | 330 | 0.87 | -0.87 | 0.00 | 180 |

FIG.10B

VOLTAGE APPLICATION ANGLE IN INITIAL MAGNETIC POLE POSITION ESTIMATION [UNIT: DEGREE]

| NO. | BASIC ENERGIZATION PATTERN | HOLD ANGLE [DEGREE] | | | | $\theta_M[i] - \theta_M[i-1]$ (mod 360) |
|---|---|---|---|---|---|---|
| | | 0 | 90 | 180 | 270 | |
| 1 | 0 | 180 | 270 | 0 | 90 | 180 |
| 2 | 180 | 0 | 90 | 180 | 270 | 180 |
| 3 | 30 | 210 | 300 | 30 | 120 | 210 |
| 4 | 210 | 30 | 120 | 210 | 300 | 180 |
| 5 | 60 | 240 | 330 | 60 | 150 | 210 |
| 6 | 240 | 60 | 150 | 240 | 330 | 180 |
| 7 | 90 | 270 | 0 | 90 | 180 | 210 |
| 8 | 270 | 90 | 180 | 270 | 0 | 180 |
| 9 | 120 | 300 | 30 | 120 | 210 | 210 |
| 10 | 300 | 120 | 210 | 300 | 30 | 180 |
| 11 | 150 | 330 | 60 | 150 | 240 | 210 |
| 12 | 330 | 150 | 240 | 330 | 60 | 180 |

FIG.11A

BASIC ENERGIZATION PATTERN

| NO. | ENERGIZATION ANGLE $\theta_M$ [DEGREE] | VOLTAGE COMMAND VALUE | | | $\theta_M[i] - \theta_M[i-1]$ (mod 360) |
|---|---|---|---|---|---|
| | | Vu* | Vv* | Vw* | |
| 1 | 0 | 1.00 | −0.50 | −0.50 | |
| 2 | 180 | −1.00 | 0.50 | 0.50 | 180 |
| 3 | 330 | 0.87 | −0.87 | 0.00 | 150 |
| 4 | 150 | −0.87 | 0.87 | 0.00 | 180 |
| 5 | 300 | 0.50 | −1.00 | 0.50 | 150 |
| 6 | 120 | −0.50 | 1.00 | −0.50 | 180 |
| 7 | 270 | 0.00 | −0.87 | 0.87 | 150 |
| 8 | 90 | 0.00 | 0.87 | −0.87 | 180 |
| 9 | 240 | −0.50 | −0.50 | 1.00 | 150 |
| 10 | 60 | 0.50 | 0.50 | −1.00 | 180 |
| 11 | 210 | −0.87 | 0.00 | 0.87 | 150 |
| 12 | 30 | 0.87 | 0.00 | −0.87 | 180 |

FIG.11B

VOLTAGE APPLICATION ANGLE IN INITIAL MAGNETIC POLE POSITION ESTIMATION [UNIT: DEGREE]

| NO. | BASIC ENERGIZATION PATTERN | HOLD ANGLE [DEGREE] | | | | $\theta_M[i] - \theta_M[i-1]$ (mod 360) |
|---|---|---|---|---|---|---|
| | | 0 | 90 | 180 | 270 | |
| 1 | 0 | 180 | 270 | 0 | 90 | 180 |
| 2 | 180 | 0 | 90 | 180 | 270 | 180 |
| 3 | 330 | 150 | 240 | 330 | 60 | 150 |
| 4 | 150 | 330 | 60 | 150 | 240 | 180 |
| 5 | 300 | 120 | 210 | 300 | 30 | 150 |
| 6 | 120 | 300 | 30 | 120 | 210 | 180 |
| 7 | 270 | 90 | 180 | 270 | 0 | 150 |
| 8 | 90 | 270 | 0 | 90 | 180 | 180 |
| 9 | 240 | 60 | 150 | 240 | 330 | 150 |
| 10 | 60 | 240 | 330 | 60 | 150 | 180 |
| 11 | 210 | 30 | 120 | 210 | 300 | 150 |
| 12 | 30 | 210 | 300 | 30 | 120 | 180 |

FIG.12A
BASIC ENERGIZATION PATTERN

| NO. | ENERGIZATION ANGLE $\theta_M$ [DEGREE] | VOLTAGE COMMAND VALUE | | | $\theta_M[i] - \theta_M[i-1]$ (mod 360) |
|---|---|---|---|---|---|
| | | Vu* | Vv* | Vw* | |
| 1 | 0 | 1.00 | −0.50 | −0.50 | |
| 2 | 150 | −0.87 | 0.87 | 0.00 | 150 |
| 3 | 300 | 0.50 | −1.00 | 0.50 | 150 |
| 4 | 90 | 0.00 | 0.87 | −0.87 | 150 |
| 5 | 240 | −0.50 | −0.50 | 1.00 | 150 |
| 6 | 30 | 0.87 | 0.00 | −0.87 | 150 |
| 7 | 180 | −1.00 | 0.50 | 0.50 | 150 |
| 8 | 330 | 0.87 | −0.87 | 0.00 | 150 |
| 9 | 120 | −0.50 | 1.00 | −0.50 | 150 |
| 10 | 270 | 0.00 | −0.87 | 0.87 | 150 |
| 11 | 60 | 0.50 | 0.50 | −1.00 | 150 |
| 12 | 210 | −0.87 | 0.00 | 0.87 | 150 |

FIG.12B
VOLTAGE APPLICATION ANGLE IN INITIAL
MAGNETIC POLE POSITION ESTIMATION [UNIT: DEGREE]

| NO. | BASIC ENERGIZATION PATTERN | HOLD ANGLE [DEGREE] | | | | $\theta_M[i] - \theta_M[i-1]$ (mod 360) |
|---|---|---|---|---|---|---|
| | | 0 | 90 | 180 | 270 | |
| 1 | 0 | 150 | 240 | 330 | 60 | 150 |
| 2 | 150 | 300 | 30 | 120 | 210 | 150 |
| 3 | 300 | 90 | 180 | 270 | 0 | 150 |
| 4 | 90 | 240 | 330 | 60 | 150 | 150 |
| 5 | 240 | 30 | 120 | 210 | 300 | 150 |
| 6 | 30 | 180 | 270 | 0 | 90 | 150 |
| 7 | 180 | 330 | 60 | 150 | 240 | 150 |
| 8 | 330 | 120 | 210 | 300 | 30 | 150 |
| 9 | 120 | 270 | 0 | 90 | 180 | 150 |
| 10 | 270 | 60 | 150 | 240 | 330 | 150 |
| 11 | 60 | 210 | 300 | 30 | 120 | 150 |
| 12 | 210 | 0 | 90 | 180 | 270 | 150 |

FIG.13A
BASIC ENERGIZATION PATTERN

| NO. | ENERGIZATION ANGLE $\theta_M$ [DEGREE] | VOLTAGE COMMAND VALUE | | | $\theta_M[i] - \theta_M[i-1]$ (mod 360) |
|---|---|---|---|---|---|
| | | Vu* | Vv* | Vw* | |
| 1 | 0 | 1.00 | −0.50 | −0.50 | |
| 2 | 210 | −0.87 | 0.00 | 0.87 | 210 |
| 3 | 60 | 0.50 | 0.50 | −1.00 | 210 |
| 4 | 270 | 0.00 | −0.87 | 0.87 | 210 |
| 5 | 120 | −0.50 | 1.00 | −0.50 | 210 |
| 6 | 330 | 0.87 | −0.87 | 0.00 | 210 |
| 7 | 180 | −1.00 | 0.50 | 0.50 | 210 |
| 8 | 30 | 0.87 | 0.00 | −0.87 | 210 |
| 9 | 240 | −0.50 | −0.50 | 1.00 | 210 |
| 10 | 90 | 0.00 | 0.87 | −0.87 | 210 |
| 11 | 300 | 0.50 | −1.00 | 0.50 | 210 |
| 12 | 150 | −0.87 | 0.87 | 0.00 | 210 |

FIG.13B
VOLTAGE APPLICATION ANGLE IN INITIAL MAGNETIC POLE POSITION ESTIMATION [UNIT: DEGREE]

| NO. | BASIC ENERGIZATION PATTERN | HOLD ANGLE [DEGREE] | | | | $\theta_M[i] - \theta_M[i-1]$ (mod 360) |
|---|---|---|---|---|---|---|
| | | 0 | 90 | 180 | 270 | |
| 1 | 0 | 210 | 300 | 30 | 120 | 210 |
| 2 | 210 | 60 | 150 | 240 | 330 | 210 |
| 3 | 60 | 270 | 0 | 90 | 180 | 210 |
| 4 | 270 | 120 | 210 | 300 | 30 | 210 |
| 5 | 120 | 330 | 60 | 150 | 240 | 210 |
| 6 | 330 | 180 | 270 | 0 | 90 | 210 |
| 7 | 180 | 30 | 120 | 210 | 300 | 210 |
| 8 | 30 | 240 | 330 | 60 | 150 | 210 |
| 9 | 240 | 90 | 180 | 270 | 0 | 210 |
| 10 | 90 | 300 | 30 | 120 | 210 | 210 |
| 11 | 300 | 150 | 240 | 330 | 60 | 210 |
| 12 | 150 | 0 | 90 | 180 | 270 | 210 |

ONE EXAMPLE OF PROCEDURE OF ESTIMATING INITIAL MAGNETIC POLE POSITION

FIG.20A

VOLTAGE APPLICATION ANGLE IN INITIAL
MAGNETIC POLE POSITION ESTIMATION [UNIT: DEGREE]

| NO. | BASIC ENERGIZATION PATTERN | APPLICATION ANGLE OF PULSE FOR REDUCING RESIDUAL MAGNETISM [DEGREE] 180 | $\theta_M[i] - \theta_M[i-1]$ (mod 360) |
|---|---|---|---|
| 1 | 0 | 0 | 180 |
| 2 | 180 | 180 | 180 |
| 3 | 30 | 30 | 210 |
| 4 | 210 | 210 | 180 |
| 5 | 60 | 60 | 210 |
| 6 | 240 | 240 | 180 |
| 7 | 90 | 90 | 210 |
| 8 | 270 | 270 | 180 |
| 9 | 120 | 120 | 210 |
| 10 | 300 | 300 | 180 |
| 11 | 150 | 150 | 210 |
| 12 | 330 | 330 | 180 |

FIG.20B

VOLTAGE APPLICATION ANGLE IN INITIAL
MAGNETIC POLE POSITION ESTIMATION [UNIT: DEGREE]

| NO. | BASIC ENERGIZATION PATTERN | APPLICATION ANGLE OF PULSE FOR REDUCING RESIDUAL MAGNETISM [DEGREE] 210 | $\theta_M[i] - \theta_M[i-1]$ (mod 360) |
|---|---|---|---|
| 1 | 0 | 0 | 150 |
| 2 | 150 | 150 | 150 |
| 3 | 300 | 300 | 150 |
| 4 | 90 | 90 | 150 |
| 5 | 240 | 240 | 150 |
| 6 | 30 | 30 | 150 |
| 7 | 180 | 180 | 150 |
| 8 | 330 | 330 | 150 |
| 9 | 120 | 120 | 150 |
| 10 | 270 | 270 | 150 |
| 11 | 60 | 60 | 150 |
| 12 | 210 | 210 | 150 |

FIG.22A

| NO. | BASIC ENERGIZATION PATTERN [DEGREE] | $\theta_M[i]-\theta_M[i-1]$ (mod 360) [DEGREE] | EXAMPLE OF CURRENT CORRECTION VALUE [A] |
|---|---|---|---|
| 1 | 0 | 180 | 0 |
| 2 | 180 | 180 | 0 |
| 3 | 30 | 210 | −0.1 |
| 4 | 210 | 180 | 0 |
| 5 | 60 | 210 | −0.1 |
| 6 | 240 | 180 | 0 |
| 7 | 90 | 210 | −0.1 |
| 8 | 270 | 180 | 0 |
| 9 | 120 | 210 | −0.1 |
| 10 | 300 | 180 | 0 |
| 11 | 150 | 210 | −0.1 |
| 12 | 330 | 180 | 0 |

FIG.22B

| NO. | BASIC ENERGIZATION PATTERN [DEGREE] | $\theta_M[i]-\theta_M[i-1]$ (mod 360) [DEGREE] | EXAMPLE OF CURRENT CORRECTION VALUE [A] |
|---|---|---|---|
| 1 | 0 | 180 | 0 |
| 2 | 180 | 180 | 0 |
| 3 | 330 | 150 | −0.1 |
| 4 | 150 | 180 | 0 |
| 5 | 300 | 150 | −0.1 |
| 6 | 120 | 180 | 0 |
| 7 | 270 | 150 | −0.1 |
| 8 | 90 | 180 | 0 |
| 9 | 240 | 150 | −0.1 |
| 10 | 60 | 180 | 0 |
| 11 | 210 | 150 | −0.1 |
| 12 | 30 | 180 | 0 |

MOTOR CONTROL DEVICE, IMAGE FORMING APPARATUS, AND METHOD FOR ESTIMATING INITIAL POSITION OF MAGNETIC POLE OF ROTOR

The entire disclosure of Japanese Patent Application No. 2019-006789, filed on Jan. 18, 2019, is incorporated herein by reference in its entirety.

BACKGROUND

Technological Field

The present disclosure relates to a motor control device, an image forming apparatus, and a method for estimating an initial position of a magnetic pole of a rotor, and is used particularly for controlling an alternating-current (AC) motor such as a sensorless-type brushless direct-current (DC) motor (also referred to as a permanent magnet synchronous motor).

Description of the Related Art

An AC motor such as a sensorless-type brushless DC motor does not include a sensor for detecting a magnetic pole position of a permanent magnet of a rotor with respect to each phase coil of a stator. Thus, in general, before starting the motor, a stator is energized at a prescribed electrical angle so as to pull the magnetic pole of the rotor to a position in accordance with the energized electrical angle (hereinafter also referred to as an energization angle), and subsequently start the rotation of the motor.

When the rotor is to be pulled, however, the rotor is pulled while being displaced by up to ±180°. Thus, the rotor may vibrate greatly. In such a case, it is necessary to wait until the vibrations are reduced to the level at which the motor can be started.

Furthermore, in the application that does not allow the rotor to move before starting the motor, a method of pulling the rotor cannot be employed. For example, when a brushless DC motor is adopted as a motor for a paper feed roller for paper conveyance in an electrophotographic-type image forming apparatus, a method of pulling a rotor cannot be employed for estimating the initial position of the magnetic pole, which is due to the following reason. Specifically, when the rotor is moved before starting the motor, a sheet of paper is fed accordingly, which leads to jamming.

Thus, an inductive sensing method (for example, see Japanese Patent No. 2547778) is known as a method of estimating a magnetic pole position of a rotor in the rest state without pulling the rotor. The method of estimating an initial position utilizes the property of an effective inductance that slightly changes in accordance with the positional relation between the magnetic pole position of the rotor and the current magnetic field by the stator winding when the stator winding is applied with a voltage at a level not causing rotation of the rotor at a plurality of electrical angles.

Estimation of the initial magnetic pole position using an inductive sensing scheme causes a problem that a significant measurement error is caused by the influence of the magnetism remaining in an iron core of a stator. Japanese Laid-Open Patent Publication No. 2013-172511 discloses a method of reducing the influence of residual magnetism by causing a current of a reverse-phase with respect to the energizing current to flow through a stator winding immediately before energization of the stator winding at each electrical angle.

SUMMARY

In the case of the method disclosed in the above-mentioned Japanese Laid-Open Patent Publication No. 2013-172511, a current of a reverse-phase for reducing the influence of residual magnetism needs to flow through the stator winding each time the electrical angle of the energizing current is changed. This requires long time to estimate the initial position of the magnetic pole of a rotor, thereby lengthening the time for starting the motor in the stopped state.

Particularly in the application that requires a motor to be frequently turned on and off, it is problematic that it takes long time to estimate the initial position of the magnetic pole of a rotor. For example, in the case of an electrophotographic-type image forming apparatus, a motor for driving a paper feed roller is temporarily stopped in the state where a sheet of paper is held by a roller nipple, and then re-started at the time of printing. Thus, requiring long time to start a motor also requires long time for printing, which is problematic particularly in terms of device performance.

The present disclosure has been made in consideration of the above-described problems. An object of the present disclosure is to reduce the influence of residual magnetism in a motor control device that controls a sensorless-type three-phase motor when estimating an initial magnetic pole position of a rotor in an inductive sensing scheme without lengthening the time required to estimate an initial magnetic pole position as compared with the conventional case.

To achieve at least one of the above-mentioned objects, according to an aspect of the present invention, a motor control device that controls a three-phase motor of a sensorless-type reflecting one aspect of the present invention comprises: a drive circuit that applies a voltage to each phase of a stator winding of the three-phase motor; and a control circuit that controls the drive circuit. When the control circuit estimates an initial position of a magnetic pole of a rotor of the three-phase motor using an inductive sense scheme, the control circuit causes the drive circuit to apply a voltage to the stator winding at each of L electric angles different from one another while sequentially changing the L electric angles, wherein L is an integer equal to or greater than 5. An absolute value of a difference between an electrical angle of the voltage applied to the stator winding at an i-th time for initial position estimation and an electrical angle of the voltage applied to the stator winding at an i−1st time for the initial position estimation is equal to or greater than 180−360/L degrees and equal to or less than 180+360/L degrees. In this case, i is an integer equal to or greater than 2 and equal to or less than L. An absolute value of a difference between an electrical angle of the voltage applied to the stator winding at a 1st time for the initial position estimation and an electrical angle of the voltage applied to the stator winding at a last time before starting the initial position estimation is equal to or greater than 180−360/L degrees and equal to or less than 180+360/L degrees.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 9 is a diagram showing the relation between the energization angle and each of the voltage command values in tabular form in a comparative example of the present embodiment.

FIGS. 10A and 10B each are a diagram showing the first specific example of the order of voltage application angles in tabular form for initial magnetic pole position estimation.

FIGS. 11A and 11B each are a diagram showing the second specific example of the order of voltage application angles in tabular form for initial magnetic pole position estimation.

FIGS. 12A and 12B each are a diagram showing the third specific example of the order of voltage application angles in tabular form for initial magnetic pole position estimation.

FIGS. 13A and 13B each are a diagram showing the fourth specific example of the order of voltage application angles in tabular form for initial magnetic pole position estimation.

FIGS. 20A and 20B each are a diagram showing a specific example of the order of angles for initial magnetic pole position estimation in a motor control device in the second embodiment.

FIGS. 22A and 22B each are a diagram for illustrating an example of a current correction value in a motor control device in the third embodiment.

DETAILED DESCRIPTION OF EMBODIMENTS

Figure 1:
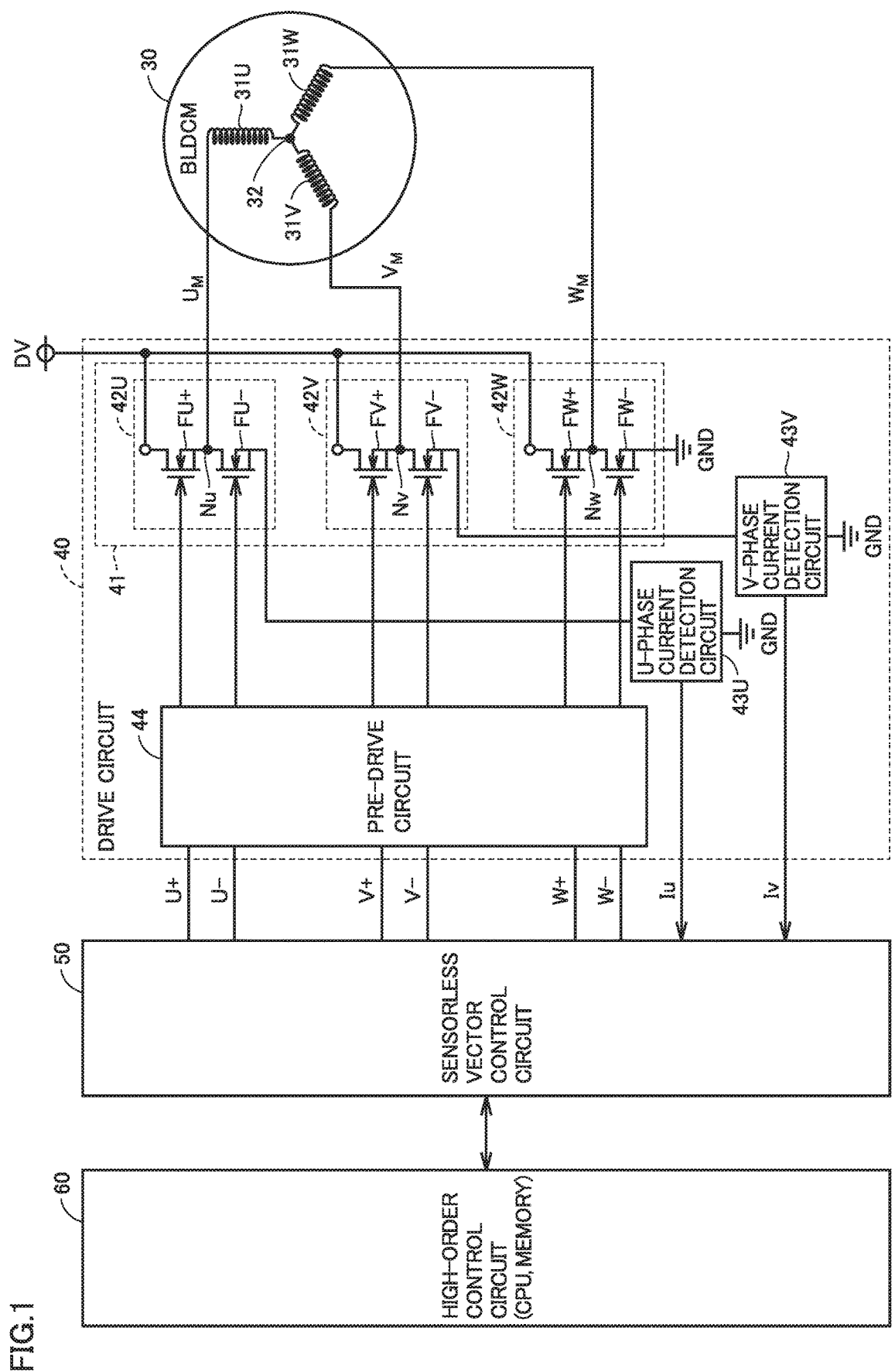
FIG. 1 is a block diagram showing the entire configuration of a motor control device.

Hereinafter, one or more embodiments of the present invention will be described with reference to the drawings. However, the scope of the invention is not limited to the disclosed embodiments.

While a brushless DC motor will be hereinafter described by way of example, the present disclosure is applicable to a sensorless-type AC motor driven by a multi-phase voltage (a brushless DC motor is also a type of an AC motor). The same or corresponding components will be denoted by the same reference characters, and description thereof will not be repeated.

First Embodiment

[Entire Configuration of Motor Control Device]

FIG. 1 is a block diagram showing the entire configuration of a motor control device. The motor control device controls driving of a sensorless-type three-phase brushless DC motor (BLDCM) 30. As shown in FIG. 1, the motor control device includes a drive circuit 40, a sensorless vector control circuit 50, and a high-order control circuit 60. Due to a sensorless-type, a Hall element or an encoder for detecting the rotation position of a rotor is not provided.

Drive circuit 40 is an inverter circuit in a pulse width modulation (PWM) control system. In the normal operation of the motor, drive circuit 40 converts a direct-current (DC) drive voltage DV into a three-phase AC voltage, and outputs the converted three-phase AC voltage. Specifically, based on inverter drive signals U+, U−, V+, V−, W+, and W− as PWM signals received from sensorless vector control circuit 50, drive circuit 40 supplies a U-phase voltage $U_M$, a V-phase voltage $V_M$, and a W-phase voltage $W_M$ to brushless DC motor 30. Drive circuit 40 includes an inverter circuit 41, a U-phase current detection circuit 43U, a V-phase current detection circuit 43V, and a pre-drive circuit 44.

Inverter circuit 41 includes a U-phase arm circuit 42U, a V-phase arm circuit 42V, and a W-phase arm circuit 42W. These arm circuits 42U, 42V, and 42W are connected in parallel with one another between the node receiving a DC drive voltage DV and the node receiving a ground voltage GND. For simplifying the following description, the node receiving DC drive voltage DV may be referred to as a drive voltage node DV while the node receiving ground voltage GND may be referred to as a ground node GND.

U-phase arm circuit 42U includes a U-phase transistor FU+ on the high potential side and a U-phase transistor FU− on the low potential side that are connected in series to each other. A connection node Nu between U-phase transistors FU+ and FU− is connected to one end of a U-phase winding 31U of brushless DC motor 30. The other end of U-phase winding 31U is connected to a neutral point 32.

As shown in FIG. 1, a U-phase winding 31U, a V-phase winding 31V, and a W-phase winding 31W of brushless DC motor 30 are coupled in a star connection. In the present specification, U-phase winding 31U, V-phase winding 31V, and W-phase winding 31W will be collectively referred to as a stator winding 31.

Similarly, V-phase arm circuit 42V includes a V-phase transistor FV+ on the high potential side and a V-phase transistor FV− on the low potential side that are connected in series to each other. A connection node Nv between V-phase transistors FV+ and FV− is connected to one end of V-phase winding 31V of brushless DC motor 30. The other end of V-phase winding 31V is connected to neutral point 32.

Similarly, W-phase arm circuit 42W includes a W-phase transistor FW+ on the high potential side and a W-phase transistor FW− on the low potential side that are connected in series to each other. A connection node Nw between W-phase transistors FW+ and FW− is connected to one end of W-phase winding 31W of brushless DC motor 30. The other end of W-phase winding 31W is connected to neutral point 32.

U-phase current detection circuit 43U and V-phase current detection circuit 43V serve as circuits for detecting a motor current with a two-shunt method. Specifically, U-phase current detection circuit 43U is connected between U-phase transistor FU− on the low potential side and ground node GND. V-phase current detection circuit 43V is connected between V-phase transistor FV− on the low potential side and ground node GND.

U-phase current detection circuit 43U and V-phase current detection circuit 43V each include a shunt resistance. The resistance value of the shunt resistance is as small as the order of $\frac{1}{10}\Omega$. Thus, the signal showing a U-phase current Iu detected by U-phase current detection circuit 43U and the signal showing a V-phase current Iv detected by V-phase current detection circuit 43V are amplified by an amplifier (not shown). Then, the signal showing U-phase current Iu and the signal showing V-phase current Iv are analog-to-digital (AD)-converted by an AD converter (not shown) and thereafter fed into sensorless vector control circuit 50.

A W-phase current Iw does not need to be detected since it can be calculated according to Kirchhoff's current rule based on U-phase current Iu and V-phase current Iv, that is, in accordance with Iw=−Iu−Iv. More generally, among U-phase current Iu, V-phase current Iv, and W-phase current Iw, currents of two phases only have to be detected, and the current value of one remaining phase can be calculated from the values of the detected currents of these two phases.

Pre-drive circuit 44 amplifies inverter drive signals U+, U−, V+, V−, W+, and W− that are PWM signals received from sensorless vector control circuit 50 so as to be output to the gates of transistors FU+, FU−, FV+, FV−, FW+, and FW−, respectively.

The types of transistors FU+, FU−, FV+, FV−, FW+, and FW− are not particularly limited, and, for example, may be a metal oxide semiconductor field effect transistor (MOSFET), may be a bipolar transistor, or may be an insulated gate bipolar transistor (IGBT).

Sensorless vector control circuit 50, which serves as a circuit for vector-controlling brushless DC motor 30, generates inverter drive signals U+, U−, V+, V−, W+, and W−, and supplies the generated signals to drive circuit 40. Furthermore, when brushless DC motor 30 is started, sensorless vector control circuit 50 estimates the initial position of the magnetic pole of the rotor in the rest state by an inductive sensing scheme.

Sensorless vector control circuit 50 may be configured as a dedicated circuit such as an application specific integrated circuit (ASIC), or may be configured to implement its function utilizing a field programmable gate array (FPGA) and/or a microcomputer.

High-order control circuit 60 is configured based on a computer including a central processing unit (CPU), memory, and the like. High-order control circuit 60 outputs a start command, a stop command, a rotation angle speed command value, and the like to sensorless vector control circuit 50.

Unlike the above-described configuration, sensorless vector control circuit 50 and high-order control circuit 60 may be configured as one control circuit by an ASIC, an FPGA or the like, or by a microcomputer.

[Overview of Motor Operation]

Figure 2:
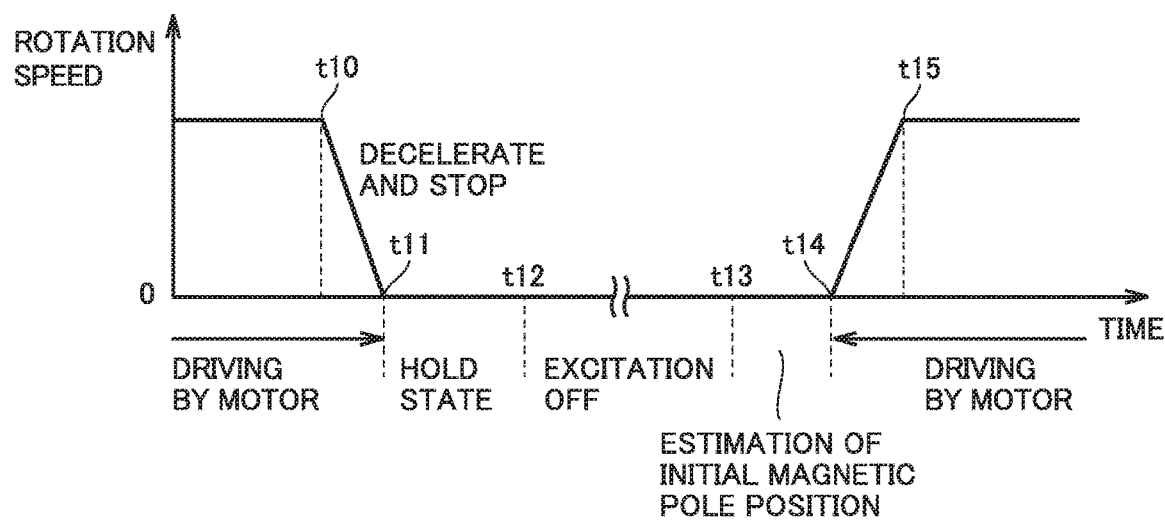
FIG. 2 is a diagram showing a change of a motor rotation speed in a time period from when a motor in a steady operation is decelerated and stopped to when the motor is restarted.

FIG. 2 is a diagram showing a change of a motor rotation speed in a time period from when a motor in a steady operation is decelerated and stopped to when the motor is restarted. In FIG. 2, the horizontal axis shows time while the vertical axis shows the rotation speed of the motor.

Referring to FIG. 2, the motor is steadily operated in a vector control scheme until a time point t10. Then, a command value of the rotation speed of the motor decreases gradually from time point t10 to a time point t11, thereby decelerating the motor to be stopped. Rotation of the motor is stopped at time point t11. At a subsequent time point t12, energization to the stator stops. From time point t12 to a subsequent time point t13, supply of the exciting current to the stator is stopped.

In this case, also in the process of deceleration stop from time point t10 to time point t11, the rotation speed of the motor is controlled in the sensorless vector control scheme. Thus, detection of a d-axis induced voltage becomes difficult in the extremely low speed state, thereby deteriorating the accuracy of estimating the position of the magnetic pole of the rotor. However, at least until immediately before time point t11 at which the motor is stopped, a voltage is continuously applied to the stator winding at an electrical angle that is based on the estimated magnetic pole position and the estimated rotation speed. As a result, in a time period from time point t11 to time point t12, the rotor is stopped in the vicinity of the electrical angle corresponding to a final voltage command value. However, since the rotor is not necessarily pulled, the electrical angle corresponding to the final voltage command value does not necessarily coincide with the magnetic pole position of the rotor. In the present disclosure, the electrical angle corresponding to the final voltage command value will be referred to as a hold angle. From time point t11 to time point t12, there is a hold state in which the rotor is stopped at the magnetic pole position in the vicinity of the hold angle.

Before the motor is restarted from a time point t14, the initial position of the magnetic pole of the rotor is estimated in a time period from time point t13 to time point t14. In order to apply a torque in the rotation direction to the rotor, a three-phase AC current needs to be supplied to stator winding 31 at an electrical angle appropriate to the initial position of the magnetic pole of the rotor. Thereby, the initial position of the magnetic pole of the rotor is estimated. In the present disclosure, an inductive sensing scheme is used as a method of estimating an initial position of the magnetic pole of the rotor. Furthermore, in the motor control device in the first embodiment, the above-mentioned hold angle is utilized for setting the electrical angle of the energization current when estimating the initial magnetic pole position.

When rotation of the rotor is started at time point t14, the brushless DC motor is subsequently controlled by a sensorless vector control scheme. The steady operation at a fixed rotation speed is started from a time point t15.

[Coordinate Axes in Sensorless Vector Control Scheme]

Figure 3:
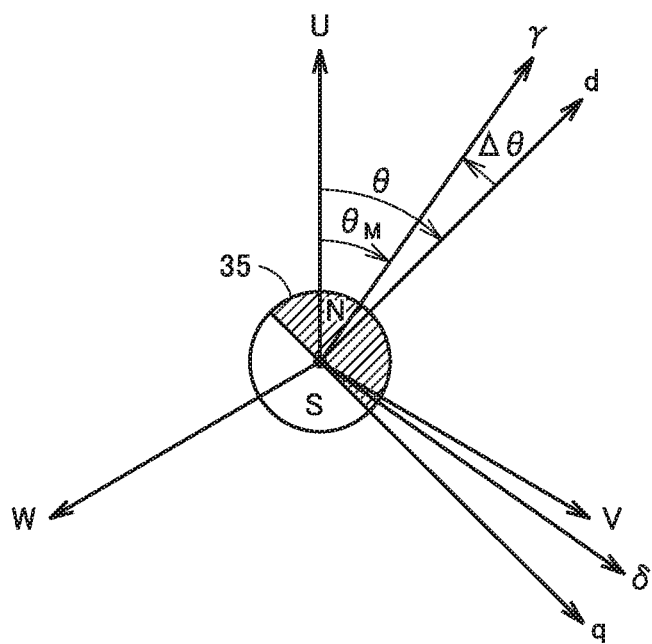
FIG. 3 is a diagram for illustrating coordinate axes for indicating an alternating current and a magnetic pole position in sensorless vector control.

FIG. 3 is a diagram for illustrating coordinate axes for indicating an alternating current and a magnetic pole position in sensorless vector control.

Referring to FIG. 3, in vector control, a three-phase (a U-phase, a V-phase, a W-phase) alternating current flowing through stator winding 31 of three-phase brushless DC motor 30 is subjected to variable transformation into a two-phase component that rotates in synchronization with the permanent magnet of the rotor. Specifically, the direction of the magnetic pole of a rotor 35 is defined as a d-axis while the direction in which the phase advances at an electrical angle of 90° from the d-axis is defined as a q-axis. Furthermore, the angle of the d-axis from the U-phase coordinate axis is defined as θ.

In the case of a sensorless vector control scheme as a control scheme not utilizing a position sensor for detecting the rotation angle of the rotor, the position information showing the rotation angle of the rotor needs to be estimated by a certain method. The estimated magnetic pole direction is defined as a γ-axis while the direction in which the phase advances at an electrical angle of 90° from the γ-axis is defined as a δ-axis. The angle of the γ-axis from the U-phase coordinate axis is defined as $\theta_M$. The delay of $\theta_M$ with respect to θ is defined as Δθ.

The coordinate axis in FIG. 3 is used also when the initial position of the magnetic pole of the rotor in the rest state is estimated in an inductive sensing scheme at the time when the motor is started. In this case, the true position of the magnetic pole of the rotor is indicated by an electrical angle θ. The electrical angle of the voltage that is applied to stator winding 31 (also referred to as an energization angle or a voltage application angle) for estimating the initial position of the magnetic pole is indicated by $\theta_M$.

[Vector Control During Motor Operation]

Figure 4:
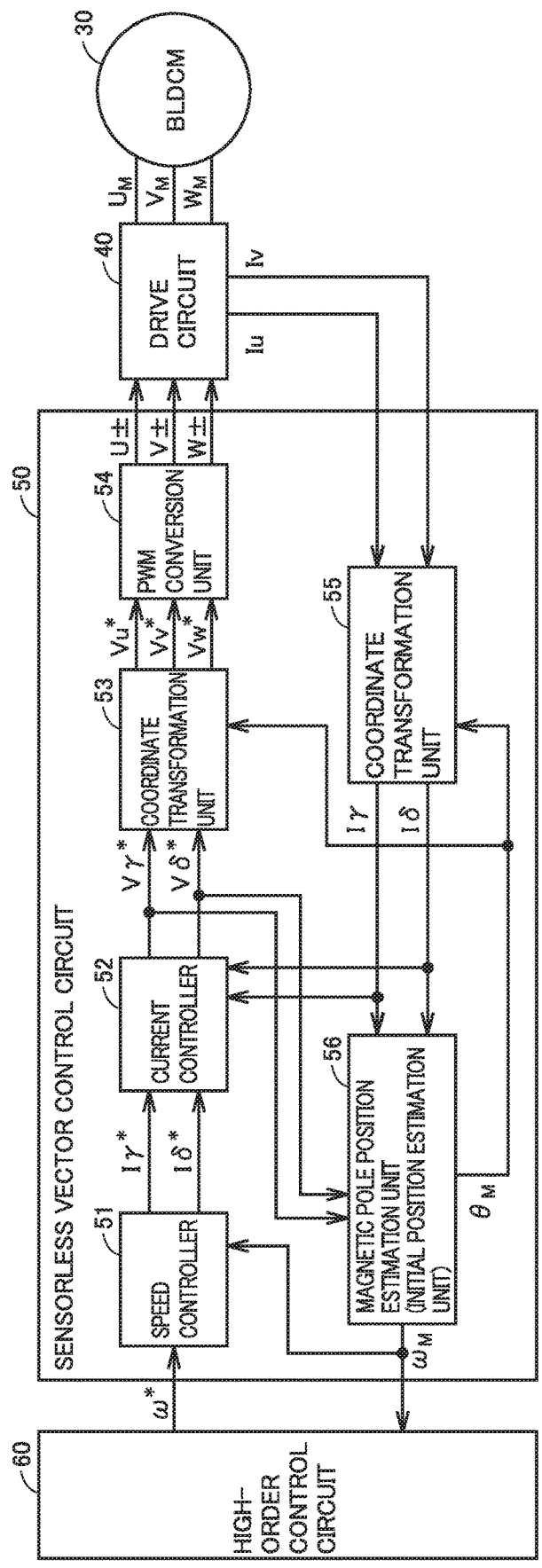
FIG. 4 is a functional block diagram showing the operation of a sensorless vector control circuit during the operation of the motor.

FIG. 4 is a functional block diagram showing the operation of a sensorless vector control circuit during the operation of the motor. Referring to FIG. 4, the operation of sensorless vector control circuit 50 during motor operation will be hereinafter simply described.

Sensorless vector control circuit 50 includes a coordinate transformation unit 55, a rotation speed controller 51, a current controller 52, a coordinate transformation unit 53, a PWM conversion unit 54, and a magnetic pole position estimation unit 56.

Coordinate transformation unit 55 receives a signal showing U-phase current Iu detected in U-phase current detection circuit 43U of drive circuit 40 and a signal showing V-phase current Iv detected in V-phase current detection circuit 43V of drive circuit 40. Coordinate transformation unit 55 calculates W-phase current Iw from U-phase current Iu and V-phase current Iv. Then, coordinate transformation unit 55 performs coordinate transformation of U-phase current Iu, V-phase current Iv, and W-phase current Iw to thereby generate a γ-axis current Iγ and a δ-axis current Iδ. This is performed specifically according to the following procedure.

First, according to the following equation (A1), coordinate transformation unit 55 transforms the currents of three phases including a U-phase, a V-phase, and a W-phase into two-phase currents of an α-axis current Iα and a β-axis current Iβ. This transformation is referred to as Clarke transformation.

$$\begin{pmatrix} I\alpha \\ I\beta \end{pmatrix} = \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} Iu \\ Iv \\ Iw \end{pmatrix} \tag{A1}$$

Then, according to the following equation (A2), coordinate transformation unit 55 transforms α-axis current Iα and β-axis current Iβ into a γ-axis current Iγ and a δ-axis current Iδ as a rotating system of coordinates. This transformation is referred to as Park transformation. In the following equation (A2), $\theta_M$ is an electrical angle of the magnetic pole direction estimated by magnetic pole position estimation unit 56, that is, an angle of the γ-axis from the U-phase coordinate axis.

$$\begin{pmatrix} I\gamma \\ I\delta \end{pmatrix} = \begin{pmatrix} \cos\theta_M & \sin\theta_M \\ -\sin\theta_M & \cos\theta_M \end{pmatrix} \begin{pmatrix} I\alpha \\ I\beta \end{pmatrix} \tag{A2}$$

Rotation speed controller 51 receives a start command, a stop command and a target rotation angle speed ω* from high-order control circuit 60. Rotation speed controller 51 determines a γ-axis current command value Iγ* and a δ-axis current command value Iδ* to brushless DC motor 30 based on target rotation angle speed ω* and a rotation angle speed $\omega_M$ of rotor 35 that is estimated by magnetic pole position estimation unit 56, for example, by proportional-integral (PI) control, proportional-integral-differential (PID) control or the like.

Current controller 52 determines a γ-axis voltage command value Vγ* and a δ-axis voltage command value Vδ*, for example, by PI control, PID control or the like based on γ-axis current command value Iγ* and δ-axis current command value Iδ* that are supplied from rotation speed controller 51, and γ-axis current Iγ and δ-axis current Iδ at present that are supplied from coordinate transformation unit 55.

Coordinate transformation unit 53 receives γ-axis voltage command value Vγ* and δ-axis voltage command value Vδ* from current controller 52. Coordinate transformation unit 53 performs coordinate transformation of γ-axis voltage command value Vγ* and δ-axis voltage command value Vδ*, to thereby generate a U-phase voltage command value Vu*, a V-phase voltage command value Vv*, and a W-phase voltage command value Vw*. This is performed specifically according to the following procedure.

First, according to the following equation (A3), coordinate transformation unit 53 transforms γ-axis voltage command value Vγ* and δ-axis voltage command value Vδ* into an α-axis voltage command value Vα* and a β-axis voltage command value Vβ*. This transformation is referred to as reverse Park transformation. In the following equation (A3), $\theta_M$ is an electrical angle in the magnetic pole direction estimated by magnetic pole position estimation unit 56, that is, an angle of the γ-axis from the U-phase coordinate axis.

$$\begin{pmatrix} V\alpha^* \\ V\beta^* \end{pmatrix} = \begin{pmatrix} \cos\theta_M & -\sin\theta_M \\ \sin\theta_M & \cos\theta_M \end{pmatrix} \begin{pmatrix} V\gamma^* \\ V\delta^* \end{pmatrix} \tag{A3}$$

Then, according to the following equation (A4), coordinate transformation unit 53 transforms α-axis voltage command value Vα* and β-axis voltage command value Vβ* into U-phase voltage command value Vu*, V-phase voltage command value Vv*, and W-phase voltage command value Vw* of three phases. This transformation is referred to as reverse Clarke transformation. In addition, transformation of two phases of α and β into three phases of a U-phase, a V-phase, and a W-phase may be performed using space vector transformation in place of reverse Clarke transformation.

$$\begin{pmatrix} V_u^* \\ V_v^* \\ V_w^* \end{pmatrix} = \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} V_\alpha^* \\ V_\beta^* \end{pmatrix} \quad (A4)$$

Based on U-phase voltage command value Vu*, V-phase voltage command value Vv* and W-phase voltage command value Vw*, PWM conversion unit 54 generates inverter drive signals U+, U−, V+, V−, W+, and W− as PWM signals for driving the gates of transistors FU+, FU−, FV+, FV−, FW+, and FW−, respectively.

Magnetic pole position estimation unit 56 estimates rotation angle speed $\omega_M$ of rotor 35 at present and an electrical angle $\theta_M$ showing the magnetic pole position of rotor 35 at present based on γ-axis current Iγ and δ-axis current Iδ, and also on γ-axis voltage command value Vγ* and δ-axis voltage command value Vδ*. Specifically, magnetic pole position estimation unit 56 calculates rotation angle speed $\omega_M$ at which the γ-axis induced voltage becomes zero, and estimates electrical angle $\theta_M$ showing the magnetic pole position based on rotation angle speed $\omega_M$. Magnetic pole position estimation unit 56 outputs the estimated rotation angle speed $\omega_M$ to high-order control circuit 60 and also to rotation speed controller 51. Furthermore, magnetic pole position estimation unit 56 outputs the information about electrical angle $\theta_M$ showing the estimated magnetic pole position to coordinate transformation units 53 and 55.

[Estimation of Initial Position of Magnetic Pole of Rotor in Rest State]

Figure 5:
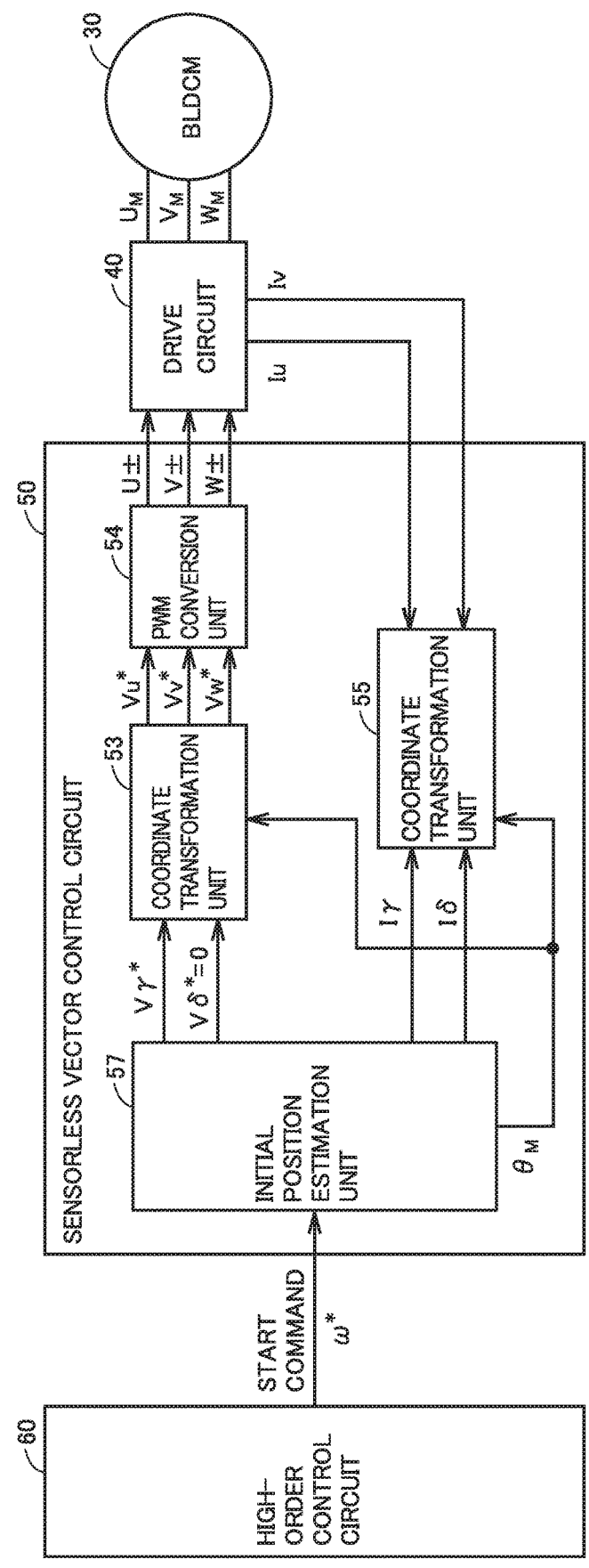
FIG. 5 is a functional block diagram illustrating a method of estimating an initial position of a magnetic pole of a rotor in the rest state.

FIG. 5 is a functional block diagram illustrating a method of estimating an initial position of a magnetic pole of a rotor in the rest state.

Since magnetic pole position estimation unit 56 in FIG. 4 utilizes the induced voltage generated in stator winding 31, it cannot be used while the rotor is stopped. Thus, in FIG. 5, an initial position estimation unit 57 for estimating the initial position of the magnetic pole of rotor 35 in an inductive sensing scheme is provided in place of magnetic pole position estimation unit 56.

In this case, in the inductive sensing scheme, a constant voltage is applied continuously or intermittently by PWM to stator winding 31 while sequentially changing a plurality of energization angles, so as to detect a change in the current flowing through stator winding 31 at each energization angle. In this case, the time period of energization to stator winding 31 and the magnitude of the voltage applied to stator winding 31 are set at levels at which rotor 35 does not rotate. However, when the energization time period is extremely short or the magnitude of the applied voltage is extremely small, the initial position of the magnetic pole cannot be detected, so that attention is required.

As described above, the method of estimating the initial position by inductive sensing utilizes the property of an effective inductance that slightly changes in accordance with the positional relation between the magnetic pole position of the rotor and the current magnetic field by the stator winding when the stator winding is applied with a voltage at a level not causing rotation of the rotor at a plurality of electrical angles. This change in inductance is based on the magnetic saturation phenomenon that remarkably occurs in the case of a d-axis current. Furthermore, in the case of an interior permanent magnet (IPM) motor having saliency by which the inductance in the q-axis direction becomes larger than the inductance in the d-axis direction, any change in inductance may be able to be detected even if no magnetic saturation occurs.

Specifically, the method often used for detecting the direction of the magnetic pole of the rotor is to set the command values for the energization time period and the applied voltage at each energization angle (specifically, the command value of the γ-axis voltage) to be constant, and detect a peak value of the γ-axis current within the energization time period to thereby determine that the energization angle at which the peak value attains a maximum value (that is, the energization angle at which an effective inductance attains a minimum value) corresponds to the magnetic pole direction. An alternative method may be to measure the time period from when energization is started until when the γ-axis current reaches a predetermined current threshold value. The energization angle corresponding to the magnetic pole position of the rotor is observed in the case where the γ-axis current reaches the current threshold value in the shortest time period, that is, in the case where the lowest inductance occurs. The following is an explanation mainly about the former method of detecting the highest peak value of the γ-axis current at each energization angle. However, the technique of the present disclosure is applicable also to the latter method, and applicable also to other methods based on the inductive sensing scheme.

Referring to FIG. 5, sensorless vector control circuit 50 includes initial position estimation unit 57, coordinate transformation unit 53, PWM conversion unit 54, and coordinate transformation unit 55 as functions for estimating the initial position of the magnetic pole of rotor 35. Thus, the initial position of the magnetic pole of the rotor is estimated using a part of the function of vector control described with reference to FIG. 4. Hereinafter, the functions of these units will be described in greater detail.

(1. Setting of γ-Axis Voltage Command Value, Energization Angle and Energization Time Period by Initial Position Estimation Unit)

Initial position estimation unit 57 sets the magnitude of γ-axis voltage command value Vγ*, electrical angle $\theta_M$ (also referred to as energization angle $\theta_M$) of each phase voltage to be applied to stator winding 31, and the energization time period. Initial position estimation unit 57 sets δ-axis voltage command value Vδ* at zero. In the case where the time period until the γ-axis current reaches a current threshold value is measured, the current threshold value is set in place of the energization time period.

The magnitude of γ-axis voltage command value Vγ* and the energization time period (or a current threshold value) are set such that γ-axis current Iγ with a sufficient SN ratio is obtained in the range not causing rotation of rotor 35. Electrical angle $\theta_M$ is set at a plurality of angles in the range from 0 degree to 360 degrees. For example, initial position estimation unit 57 changes electrical angle $\theta_M$ in a range from 0 degree to 360 degrees by 30 degrees. In the case of the present disclosure, the order of energization is not the ascending order or the descending order of the electrical angles.

(2. Coordinate Transformation Unit 53)

Coordinate transformation unit 53 performs coordinate transformation of γ-axis voltage command value Vγ* and δ-axis voltage command value Vδ* (=0), to thereby generate U-phase voltage command value Vu*, V-phase voltage command value Vv*, and W-phase voltage command value Vw*. This coordinate transformation is performed, for example, using reverse Park transformation represented by the above-mentioned equation (A3) and reverse Clarke transformation represented by the above-mentioned equation (A4).

Specifically, U-phase voltage command value Vu*, V-phase voltage command value Vv*, and W-phase voltage command value Vw* are represented by the following equation (A5). In the following equation (A5), the amplitude of the voltage command value is defined as $V_0$.

$$\begin{cases} Vu^* = V_0\cos\theta_M \\ Vv^* = V_0\cos(\theta_M - 120°) \\ Vw^* = V_0\cos(\theta_M - 240°) \end{cases} \quad (A5)$$

Figure 6:
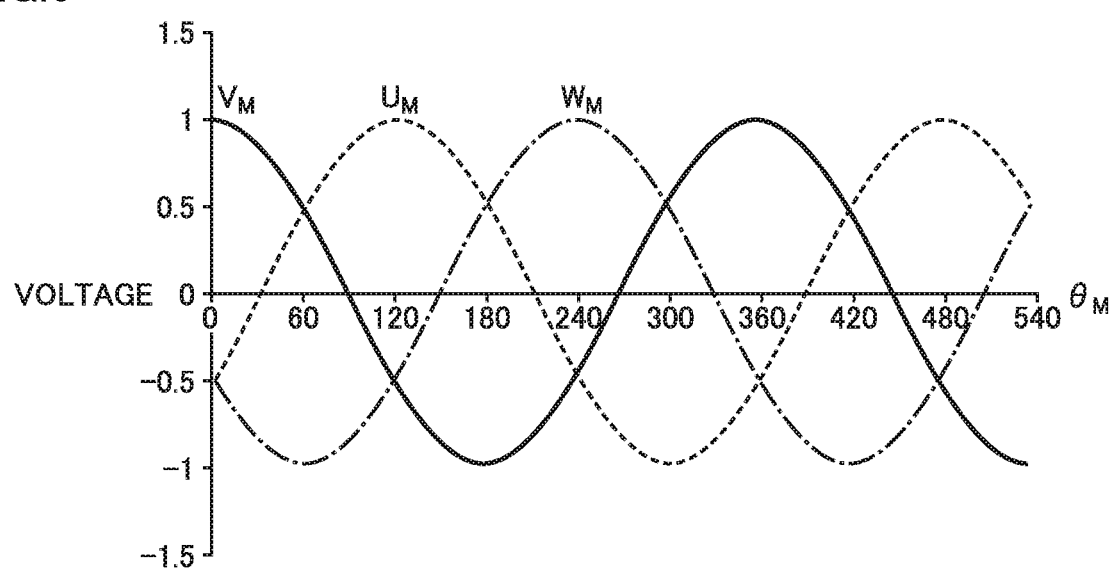
FIG. 6 is a diagram illustrating the relation between an electrical angle and each of a U-phase voltage command value, a V-phase voltage command value and a W-phase voltage command value.

FIG. 6 is a diagram illustrating the relation between the electrical angle and each of the U-phase voltage command value, the V-phase voltage command value and the W-phase voltage command value, shown in the above-mentioned equation (A5). In FIG. 6, amplitude $V_0$ of the voltage command value in the above-mentioned equation (A5) is normalized to 1.

Referring to FIG. 6, U-phase voltage command value Vu*, V-phase voltage command value Vv*, and W-phase voltage command value Vw* can be set with respect to $\theta_M$ that is arbitrarily set. For example, when $\theta_M$=0°, then, Vu*=1 and Vv*=Vw*=−0.5. When $\theta_M$=30°, then, Vu*=(√3)/2≈0.87, Vv*=0, and Vw*=−(√3)/2≈−0.87.

(3. PWM Conversion Unit 54)

Again referring to FIG. 5, based on U-phase voltage command value Vu*, V-phase voltage command value Vv* and W-phase voltage command value Vw*, PWM conversion unit 54 generates inverter drive signals U+, U−, V+, V−, W+, and W− as PWM signals for driving the gates of transistors FU+, FU−, FV+, FV−, FW+, and FW−, respectively.

According to the generated inverter drive signals U+, U−, V+, V−, W+, and W−, drive circuit 40 supplies U-phase voltage $U_M$, V-phase voltage $V_M$, and W-phase voltage $W_M$ to U-phase winding 31U, V-phase winding 31V, and W-phase winding 31W, respectively, of brushless DC motor 30. The total number of pulses of the inverter drive signals corresponds to the energization time period that has been set. U-phase current detection circuit 43U and V-phase current detection circuit 43V that are provided in drive circuit 40 detect U-phase current Iu and V-phase current Iv, respectively. The signals showing the detected U-phase current Iu and V-phase current Iv are input into coordinate transformation unit 55.

(4. Coordinate Transformation Unit 55)

Coordinate transformation unit 55 calculates W-phase current Iw based on U-phase current Iu and V-phase current Iv. Then, coordinate transformation unit 55 performs coordinate transformation of U-phase current Iu, V-phase current Iv, and W-phase current Iw, to thereby generate γ-axis current Iγ and δ-axis current Iδ. This coordinate transformation is performed using Clarke transformation in the above-mentioned equation (A1) and Park transformation in the above-mentioned equation (A2).

In addition, if there is no difference in electrical property and magnetic property among the U-phase, the V-phase and the W-phase, and also if there is no influence of the permanent magnet of rotor 35, the ratio among U-phase current Iu, V-phase current Iv, and W-phase current Iw should be equal to the ratio among voltage command values Vu*, Vv*, and Vw*. Accordingly, in this virtual case, δ-axis current Iδ is zero irrespective of the energization angle while γ-axis current Iγ is a fixed value irrespective of the energization angle. In fact, however, the magnitude of γ-axis current Iγ changes in accordance with the position of the permanent magnet of the rotor with respect to the stator winding. Also, the electrical property and the magnetic property vary among the phases depending on the structures of the stator and the rotor, so that the magnitude of γ-axis current Iγ changes.

Figure 7:
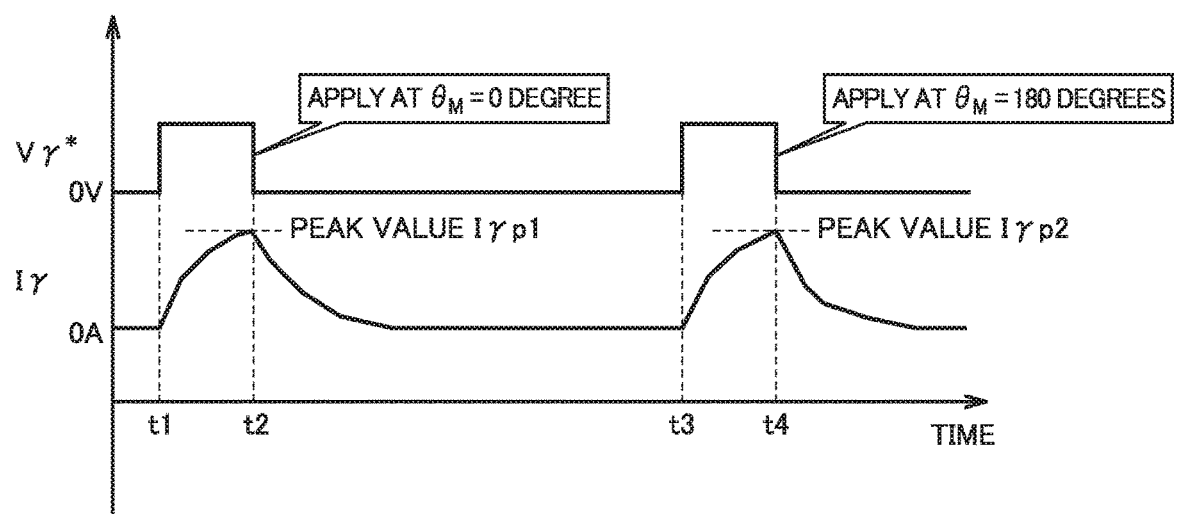
FIG. 7 is a timing chart schematically illustrating an example of the relation between a γ-axis voltage command value and the detected γ-axis current.

FIG. 7 is a timing chart schematically illustrating an example of the relation between γ-axis voltage command value Vγ* and the detected γ-axis current Iγ.

Referring to FIG. 7, in a time period from a time point t1 to a time point t2, initial position estimation unit 57 in FIG. 5 first sets energization angle $\theta_M$ at zero degree and also sets γ-axis voltage command value Vγ* at a prescribed set value. Thereby, pulse-width-modulated U-phase voltage $U_M$, V-phase voltage $V_M$ and W-phase voltage $W_M$ are applied to U-phase winding 31U, V-phase winding 31V, and W-phase winding 31W, respectively, of the stator. As a result, in a time period from time point t1 to time point t2, γ-axis current Iγ gradually increases from 0 A and reaches a peak value Iγp1 at time point t2. At and after time point t2, voltage application to stator winding 31 is stopped, so that γ-axis current Iγ gradually decreases. During a time period until a time point t3 at which a voltage is applied to stator winding 31 next time, the values of U-phase current Iu, V-phase current Iv, and W-phase current Iw return to zero, with the result that the value of γ-axis current Iγ also returns to zero.

Then, in a time period from time point t3 to a time point t4, initial position estimation unit 57 sets energization angle $\theta_M$ at 180 degrees and also sets γ-axis voltage command value Vγ* at the same set value as the previous value. As a result, γ-axis current Iγ gradually increases from 0 A in a time period from time point t3 to time point t4, and reaches a peak value Iγp2 at time point t4. At and after time point t4, voltage application to stator winding 31 is stopped, so that γ-axis current Iγ gradually decreases.

Subsequently, in a similar manner, the set angle of energization angle $\theta_M$ is changed. Then, at the changed energization angle $\theta_M$, a pulse-width-modulated constant voltage is applied to stator winding 31. In this case, γ-axis voltage command value Vγ* is the same at each energization angle while the energization time period is also the same at each energization angle. Then, the peak value of γ-axis current Iγ at the end of voltage application is detected.

(5. Estimation of Magnetic Pole Position of Rotor by Initial Position Estimation Unit)

Again referring to FIG. 5, initial position estimation unit 57 estimates the initial position of the magnetic pole of rotor 35 based on the peak value of γ-axis current Iγ obtained with respect to each of the plurality of energization angles $\theta_M$. Alternatively, the initial position of the magnetic pole of rotor 35 may be estimated based on the time period from when energization is started to when the γ-axis current reaches the current threshold value.

Figure 8A:
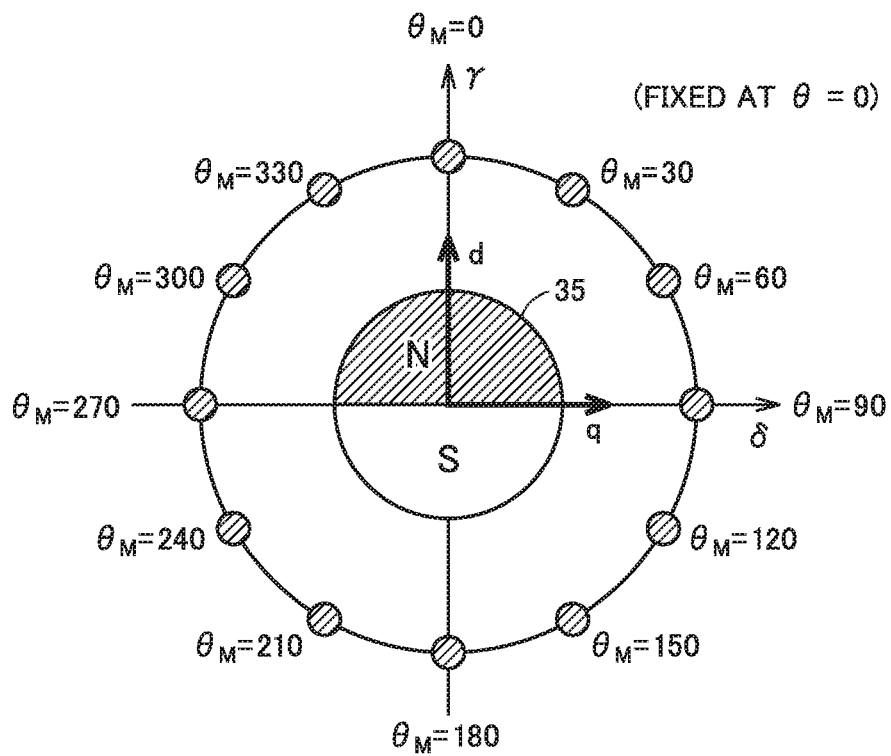
FIGS. 8A and 8B each are a diagram illustrating the relation between: a peak value of the γ-axis current; and the relative positional relation between the magnetic pole position of the rotor and an energization angle.
Figure 8B:
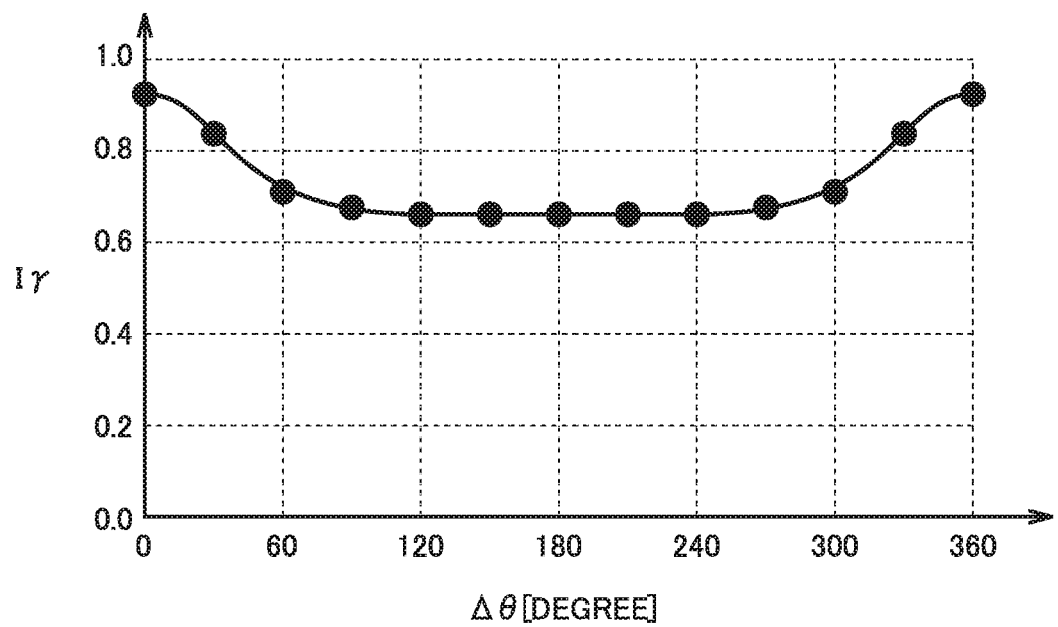

FIGS. 8A and 8B each are a diagram illustrating the relation between: the peak value of the γ-axis current; and the relative positional relation between the magnetic pole position of the rotor and the energization angle. First, referring to FIG. 8A, the relative positional relation between magnetic pole position θ of rotor 35 and energization angle $\theta_M$ will be described below.

In the case of FIG. 8A, magnetic pole position θ of rotor 35 is fixed at 0°. Accordingly, the d-axis is set in the direction of an electrical angle 0° while the q-axis is set in the direction of an electrical angle 90°. On the other hand, energization angle $\theta_M$ changes from 0° to 360° by 30°. FIG. 8A shows a γ-axis and a δ-axis in the case where energization angle $\theta_M$ is 0°. In this case, $\Delta\theta = 0°$.

Then, referring to FIG. 8B, the relation between the peak value of a γ-axis current Iγ and an angle difference Δθ between magnetic pole position θ and energization angle $\theta_M$ will be described. In FIG. 8B, the horizontal axis shows angle difference Δθ while the vertical axis shows a peak value of γ-axis current Iγ. The unit of the vertical axis is an arbitrary unit.

As shown in FIG. 8B, ideally, when angle difference Δθ between magnetic pole position θ and energization angle $\theta_M$ is 0°, that is, when magnetic pole position θ is equal to energization angle $\theta_M$ (the case where $\theta = \theta_M = 0°$ in FIG. 8A), the peak value of γ-axis current Iγ shows a maximum value.

[Influence of Residual Magnetism in Initial Magnetic Pole Position Estimation in Inductive Sensing Scheme]

In initial magnetic pole position estimation in an inductive sensing scheme, the magnetism remaining in the stator iron core may cause a measurement error. For example, when energization angle $\theta_M$ is changed from 0° to 330° by 30° in ascending order, the influence of residual magnetism significantly appears, which will be hereinafter specifically described with reference to FIG. 9.

FIG. 9 is a diagram showing the relation between the energization angle and each of the voltage command values in tabular form in a comparative example of the present embodiment.

In FIG. 9, the order of voltage application is indicated by numbers (No.) 1 to 12. Thus, energization angle $\theta_M$ changes from 0° to 330° by 30° in ascending order. In this case, the angle difference between an electrical angle $\theta_M[i]$ during the i-th energization (where i=2 to 12) and an electrical angle $\theta_M[i-1]$ during its preceding i-1st energization (that is, $\theta_M[i] - \theta_M[i-1]$) is 30°. Furthermore, U-phase, V-phase and W-phase voltage command values Vu*, Vv* and Vw* in FIG. 9 are calculated according to the above-mentioned equation (A5). In this case, amplitude $V_0$ in the equation (A5) is normalized to 1.

Referring to FIG. 9, for example, in the case of energization at an electrical angle of 0° and subsequently at an electrical angle of 30°, the U-phase winding of the stator is applied with the voltage of the same polarity at an electrical angle of 0° and at an electrical angle of 30°. Thus, the magnetic flux generated in the U-phase winding by energization at an electrical angle of 30° is added with the magnetic flux by the magnetism remaining in the U-phase stator iron core by energization at its preceding electrical angle of 0°. As a result, magnetic saturation is more likely to occur in the U-phase stator iron core, which may lead to errors in estimation of the initial magnetic pole position. Similarly, the magnetic flux generated in the U-phase stator winding during energization at each of electrical angles of 60°, 150° to 240° and 330° is also added with residual magnetic flux generated by energization at its preceding energization angle, which may also lead to errors in estimation of the initial magnetic pole position. A similar problem occurs also in the case of the V-phase and the W-phase.

In order to solve the above-described problem, as disclosed in Japanese Laid-Open Patent Publication No. 2013-172511, there is a method of reducing the influence of residual magnetism by causing a current of a reverse-phase with respect to the energizing current to flow through the stator winding immediately before energization of the stator winding at each electrical angle. However, this method requires extra time to cause a reverse-phase current to flow through the stator winding for reducing the residual magnetism each time the electrical angle of the energizing current is changed, which causes a problem that the entire time period required to estimate the initial magnetic pole position is lengthened.

[Order of Voltage Application in Estimation of Initial Magnetic Pole Position]

In order to prevent the influence of residual magnetism as much as possible on the precondition that the entire time period required for initial magnetic pole position estimation is not longer than that in the conventional case, the motor control device in the present embodiment is configured such that a voltage for initial magnetic pole position estimation is applied to the stator winding in order of electrical angles as described below.

In the present disclosure, the electrical angle of the voltage applied to the stator winding will also be referred to as an energization angle or a voltage application angle. The energization angle corresponds to $\theta_M$ in FIGS. 3 and 6.

Specifically, while sequentially changing L (for example, L is an integer equal to or greater than 5) electrical angles that are different from one another, initial position estimation unit 57 in FIG. 5 causes drive circuit 40 to apply a voltage to each phase of the stator winding at each electrical angle. Then, initial position estimation unit 57 estimates the initial position of the magnetic pole of the rotor based on the value of the current of the stator winding detected by voltage application at each of L electrical angles.

In this case, in order to reduce the influence of residual magnetism, the electrical angle of the voltage applied to the stator winding at the i-th time (where i is an integer equal to or greater than 2 and equal to or less than L) and the electrical angle of the voltage applied to the stator winding at the i−1st time are selected such that the absolute value of the difference between these electrical angles becomes equal to or greater than (180−360/L) degrees and equal to or less than (180+360/L) degrees. Furthermore, the electrical angle of the voltage applied to the stator winding at the 1st time for initial position estimation is set with respect to the electrical angle of the voltage applied to the stator winding at the last time before starting initial position estimation such that the absolute value of the difference between these electrical angles becomes equal to or greater than 180−360/L degrees and equal to or less than 180+360/L degrees. In the first embodiment, the electrical angle of the voltage applied to the stator winding at the last time before starting initial position estimation corresponds to the hold angle described with reference to FIG. 2.

By setting the electrical angle of the voltage applied to the stator winding for initial position estimation as described above, the voltage applied to each phase of the stator winding at the i-th time (2≤i≤L) for initial position estimation and the voltage applied to the corresponding phase of the stator winding at the i−1st time (that is, the voltages of the same phase) are different in polarity from each other, at least one of these voltages is zero, or these voltages are identical in polarity but each have a relatively small magnitude. As a result, the influence of residual magnetism can be reduced as much as possible.

Similarly, the voltage applied to each phase of the stator winding at the 1st time for initial position estimation and the voltage applied to the corresponding phase of the stator winding at the last time before starting initial position estimation are different in polarity from each other, at least one of these voltages is zero, or these voltages are identical in polarity but each have a relatively small magnitude. As a result, the influence of residual magnetism can be reduced as much as possible.

The following is a further explanation with reference to specific examples. In the following specific examples, L electrical angles correspond to the respective angles obtained by dividing 360 degrees equally into L segments. Furthermore, each of FIGS. 10A and 10B to FIGS. 13A and 13B shows the case where L=12 by way of example, but the technique of the present disclosure is not necessarily limited to the case where L=12.

Specific Example 1

FIGS. 10A and 10B each are a diagram showing the first specific example of the order of voltage application angles in tabular form for initial magnetic pole position estimation. FIG. 10A shows a basic pattern of the order of voltage application angles (hereinafter also referred to as a basic energization pattern). FIG. 10B shows the order of voltage application angles at the time when the basic energization pattern is corrected in accordance with the hold angle.

FIG. 10A also shows voltage command values Vu*, Vv*, and Vw* corresponding to the energization angles. Furthermore, each of FIGS. 10A and 10B shows the angle difference between an energization angle $\theta_M[i]$ at the i-th time ($2 \leq i \leq 12$) and an energization angle $\theta_M[i-1]$ at the i-1st time (that is, $\theta_M[i]-\theta_M[i-1]$). In the case of the negative angle difference, 360 degrees is added. In other words, the value of $(\theta_M[i]-\theta_M[i-1])$ mod 360 is shown using a remainder function mod.

In the basic energization patterns in specific example 1, odd-numbered energization angle $\theta_M[2m-1]$ in which i=2m−1 (where $1 \leq m \leq 6$) is denoted as $(m-1) \times 30°$. Also, even-numbered energization angle $\theta_M[2m]$ in which i=2m is denoted as $180°+(m-1) \times 30°$. In this case, the odd-numbered energization angle is a value obtained by adding 210° to the even-numbered energization angle (the value is a remainder as a result of division by 360). Also, the even-numbered energization angle is a value obtained by adding 180° to the odd-numbered energization angle (the value is a remainder as a result of division by 360).

More generally, assuming that L=2n (where n is an integer equal to or greater than 3), the (2m−1)-th energization angle $\theta_M[2m-1]$ (where $1 \leq m \leq n$) is given by the following equation.

$$\theta_M[2m-1]=360° \times (m-1)/(2n) \quad (B1)$$

Also, the (2m)-th energization angle $\theta_M[2m]$ is given by the following equation.

$$\theta_M[2m]=180°+360° \times (m-1)/(2n) \quad (B2)$$

In this case, the difference of the electrical angles between the voltage application at an electrical angle and the voltage application at the next electrical angle is obtained as the following equation.

$$(\theta_M[2m]-\theta_M[2m-1]) \bmod 360 = 180° \quad (B3)$$

(where $1 \leq m \leq n$)
or $$(\theta_M[2m+1]-\theta_M[2m]) \bmod 360 = 180°+360°/L \quad (B4)$$

(where $1 \leq m \leq n-1$).

Furthermore, FIG. 10A shows voltage command values Vu*, Vv*, and Vw* obtained when energization angle $\theta_M[i]$ (where $1 \leq i \leq 12$) is substituted into the above-mentioned equation (A5). In this case, a voltage amplitude $V_0$ in the equation (A5) is normalized to 1.

As shown in FIG. 10A, the voltage applied to each phase of the stator winding at the i-th time (where $2 \leq i \leq 12$) for initial position estimation and the voltage applied to the corresponding phase of the stator winding at the i−1st time (that is, the voltages of the same phase) are different in polarity from each other, or at least one of these voltages is zero, but these voltages are not identical in polarity to each other. As a result, the influence of residual magnetism can be reduced.

Then, as shown in FIG. 10B, the above-mentioned basic energization patterns are corrected in accordance with the electrical angle of the voltage applied to the stator winding at the last time before starting initial position estimation, that is, in accordance with the hold angle described with reference to FIG. 2.

Specifically, among L angles obtained by dividing 360 degrees equally into L segments (L=12 in the cases of FIGS. 10A and 10B), the angle closest to the value obtained by adding 180 degrees to a hold angle $\theta h$ (in the case of 360° or more, the value is a remainder as a result of division by 360) is set as a correction angle $\theta a$. Then, the value obtained by adding this correction angle $\theta a$ to each of energization angles $\theta_M[i]$ (where $1 \leq i \leq L$) of the above-mentioned basic energization patterns is determined as a final energization angle.

FIG. 10B shows the case of four types of hold angles $\theta h$ including 0 degree, 90 degrees, 180 degrees, and 270 degrees. In this case, correction angles $\theta a$ are 180 degrees, 270 degrees, 0 degree, and 90 degrees.

Accordingly, the final energization angle can be calculated by $(\theta_M[i]+\theta a) \bmod 360$ with respect to each integer i that satisfies the condition of $1 \leq i \leq L$.

As shown in FIG. 10B, when energization angle $\theta_M[i]$ at each time is set in accordance with hold angle $\theta h$, the voltage applied to each phase of the stator winding at the 1st time for initial position estimation and the voltage applied to the corresponding phase of the stator winding at the last time before starting initial position estimation are different in polarity from each other, or at least one of these voltages is zero. As a result, the influence of residual magnetism can be reduced.

Specific Example 2

FIGS. 11A and 11B each are a diagram showing the second specific example of the order of voltage application angles in tabular form for initial magnetic pole position estimation. The second specific example is a modification of the first specific example. FIG. 11A and FIG. 11B correspond to FIG. 10A and FIG. 10B, respectively.

In the basic energization patterns in specific example 2, odd-numbered energization angle $\theta_M[2m-1]$ in which i=2m−1 (where $1 \leq m \leq 6$) is denoted as $360°-(m-1) \times 30°$. Also, even-numbered energization angle $\theta_M[2m]$ in which i=2m is denoted as $180°-(m-1) \times 30°$. In this case, the odd-numbered energization angle is a value obtained by adding 150° to the even-numbered energization angle (the value is a remainder as a result of division by 360). The even-numbered energization angle is a value obtained by adding 180° to the odd-numbered energization angle (the value is a remainder as a result of division by 360).

More generally, assuming that L=2n (where n is an integer equal to or greater than 3), the (2m−1)-th energization angle $\theta_M[2m-1]$ (where 1≤m≤n) is given by the following equation.

$$\theta_M[2m-1]=360°-360°\times(m-1)/(2n) \quad (B5)$$

Also, the (2m)-th energization angle $\theta_M[2m]$ is given by the following equation.

$$\theta_M[2m]=180°-360°\times(m-1)/(2n) \quad (B6)$$

In this case, the difference of the electrical angles between the voltage application at an electrical angle and the voltage application at the next electrical angle is obtained as the following equation.

$$(\theta_M[2m]-\theta_M[2m-1]) \bmod 360=180° \quad (B7)$$

(where 1≤m≤n)

or $$(\theta_M[2m+1]-\theta_M[2m]) \bmod 360=180°-360°/L \quad (B8)$$

(where 1≤m≤n−1)

Furthermore, FIG. 11A shows voltage command values Vu*, Vv*, and Vw* obtained when energization angle $\theta_M[i]$ (where 1≤i≤12) is substituted into the above-mentioned equation (A5). In this case, voltage amplitude $V_0$ in the equation (A5) is normalized to 1.

As shown in FIG. 11A, the voltage applied to each phase of the stator winding at the i-th time (where 2≤i≤12) for initial position estimation and the voltage applied to the corresponding phase of the stator winding at the i−1st time (that is, the voltages of the same phase) are different in polarity from each other, or at least one of these voltages is zero, but these voltages are not identical in polarity to each other. As a result, the influence of residual magnetism can be reduced.

Then, as shown in FIG. 11B, the above-mentioned basic energization patterns are corrected in accordance with the electrical angle of the voltage applied to the stator winding at the last time before starting initial position estimation, that is, in accordance with hold angle θh described with reference to FIG. 2.

Specifically, as in FIG. 10B, among L angles obtained by dividing 360 degrees equally into L segments (L=12 in the cases of FIGS. 10A and 10B), the angle closest to the value obtained by adding 180 degrees to hold angle θh (in the case of 360° or more, the value is a remainder as a result of division by 360) is set as correction angle θa. Then, the value obtained by adding this correction angle θa to each of energization angles $\theta_M[i]$ (where 1≤i≤L) of the above-mentioned basic energization patterns (the value is a remainder as a result of division by 360) is determined as a final energization angle.

As shown in FIG. 11B, when energization angle $\theta_M[i]$ at each time is set in accordance with hold angle θh, the voltage applied to each phase of the stator winding at the 1st time for initial position estimation and the voltage applied to the corresponding phase of the stator winding at the last time before starting initial position estimation are different in polarity from each other, or at least one of these voltages is zero. As a result, the influence of residual magnetism can be reduced.

Specific Example 3

FIGS. 12A and 12B each are a diagram showing the third specific example of the order of voltage application angles in tabular form for initial magnetic pole position estimation. FIG. 12A shows basic energization patterns. FIG. 12B shows the order of voltage application angles at the time when the basic energization patterns are corrected in accordance with the hold angles.

FIG. 12A also shows voltage command values Vu*, Vv*, and Vw* corresponding to the energization angles. Each of FIGS. 12A and 12B shows the angle difference between the i-th (2≤i≤L) energization angle $\theta_M[i]$ and the i−1st energization angle $\theta_M[i-1]$, that is, the value of $(\theta_M[i]-\theta_M[i-1])$ mod 360.

In the basic energization patterns in specific example 3, the i-th (where 1≤i≤12) energization angle $\theta_M[i]$ is represented by the remainder obtained by dividing (i−1)×150° by 360.

More generally, assuming that L=2n (where n is an integer equal to or greater than 4 while n−1 and 2n are prime to each other), the i-th energization angle $\theta_M[i]$ (where 1≤i÷2n) is given by the following equation.

$$\theta_M[i]=\bmod((i-1)\times(n-1),2n)\times360°/(2n) \quad (B9)$$

In this case, mod ((i−1)×(n−1), 2n) is a remainder obtained by dividing (i−1)×(n−1) by 2n.

In the above-mentioned case, the difference of the electrical angles between the voltage application at an electrical angle and the voltage application at the next electrical angle is represented in the following equation (where 2≤i≤L).

$$(\theta_M[i]-\theta_M[i-1]) \bmod 360=180°-360°/L \quad (B10)$$

FIG. 12A also shows voltage command values Vu*, Vv*, and Vw* obtained when energization angle $\theta_M[i]$ (where 1≤i≤12) is substituted into the above-mentioned equation (A5). In this case, voltage amplitude $V_0$ in the equation (A5) is normalized to 1.

As shown in FIG. 12A, the voltage applied to each phase of the stator winding at the i-th time (where 2≤i≤12) for initial position estimation and the voltage applied to the corresponding phase of the stator winding at the i−1st time (that is, the voltages of the same phase) are different in polarity from each other, or at least one of these voltages is zero, but these voltages are not identical in polarity to each other. Furthermore, when the voltage applied to a phase of the stator winding at the j-th time (where 2≤j≤11) is zero, the voltage applied to the same phase at the j−1st time and the voltage applied to the same phase at the j+1st time are opposite in polarity to each other. As a result, the influence of residual magnetism can be reduced.

Then, as shown in FIG. 12B, the above-mentioned basic energization patterns are corrected in accordance with the electrical angle of the voltage applied to the stator winding at the last time before starting initial position estimation, that is, in accordance with the hold angle described with reference to FIG. 2.

Specifically, among L angles obtained by dividing 360 degrees equally into L segments (L=12 in the cases of FIGS. 12A and 12B), the angle closest to the value obtained by adding (180°+360°/L) degrees to hold angle θh (in the case of 360° or more, the value is a remainder as a result of division by 360) is set as a correction angle θa. Then, the value obtained by adding this correction angle θa to each of energization angles $\theta_M[i]$ (where 1≤i≤L) of the above-mentioned basic energization patterns (the value is a remainder as a result of division by 360) is determined as a final energization angle.

FIG. 12B shows the case of four types of hold angles θh including 0 degree, 90 degrees, 180 degrees, and 270 degrees. In this case, correction angles θa are 150 degrees, 240 degrees, 330 degrees, and 60 degrees. Thus, the final energization angle can be calculated by $(\theta_M[i]+\theta a)\mod 360$ with respect to each integer i that satisfies the condition of $1 \le i \le L$.

As shown in FIG. 12B, when energization angle $\theta_M[i]$ at each time is set in accordance with hold angle θh, the voltage applied to each phase of the stator winding at the 1st time for initial position estimation and the voltage applied to the corresponding phase of the stator winding at the last time before starting initial position estimation are different in polarity from each other, or at least one of these voltages is zero. As a result, the influence of residual magnetism can be reduced.

Specific Example 4

FIGS. 13A and 13B each are a diagram showing the fourth specific example of the order of voltage application angles in tabular form for initial magnetic pole position estimation. The fourth specific example is a modification of the third specific example. FIG. 13A and FIG. 13B correspond to FIG. 12A and FIG. 12B, respectively.

In the basic energization patterns in specific example 4, the i-th (where $1 \le i \le 12$) energization angle $\theta_M[i]$ is represented by the remainder obtained by dividing (i−1)×210° by 360.

More generally, assuming that L=2n (where n is an integer equal to or greater than 4 while n+1 and 2n are prime to each other), the i-th energization angle $\theta_M[i]$ (where $1 \le i \le 2n$) is given by the following equation.

$$\theta_M[i]=\mod((i-1)\times(n+1),2n)\times360°/(2n) \quad (B11)$$

In this case, mod((i−1)×(n+1), 2n) is a remainder obtained by dividing (i−1)×(n+1) by 2n.

In the above-described case, the difference of the electrical angles between voltage application at an electrical angle and the voltage application at the next electrical angle is represented in the following equation (where $2 \le i \le L$).

$$(\theta_M[i]-\theta_M[i-1])\mod 360=180°+360°/L \quad (B12)$$

The example in FIG. 13A shows the case where n=6. It should be noted that the value of n is not limited to 6.

Furthermore, FIG. 13A shows voltage command values Vu*, Vv*, and Vw* obtained when energization angle $\theta_M[i]$ (where $1 \le i \le 12$) is substituted into the above-mentioned equation (A5). In this case, voltage amplitude $V_0$ in the equation (A5) is normalized to 1.

As shown in FIG. 13A, the voltage applied to each phase of the stator winding at the i-th time (where $2 \le i \le 12$) for initial position estimation and the voltage applied to the corresponding phase of the stator winding at the i−1st time for initial position estimation (that is, the voltages of the same phase) are different in polarity from each other, or at least one of these voltages is zero, but these voltages are not identical in polarity to each other. Furthermore, when the voltage applied to a phase of the stator winding at the j-th time (where $2 \le j \le 11$) is zero, the voltage applied to the same phase at the j−1st time and the voltage applied to the same phase at the j+1st time are opposite in polarity to each other. As a result, the influence of residual magnetism can be reduced.

Then, as shown in FIG. 13B, the above-mentioned basic energization patterns are corrected in accordance with the electrical angle of the voltage applied to the stator winding at the last time before starting initial position estimation, that is, in accordance with the hold angle described with reference to FIG. 2.

Specifically, among L angles obtained by dividing 360 degrees equally into L segments (L=12 in the cases of FIGS. 13A and 13B), the angle closest to the value obtained by adding (180°+360°/L) degrees to hold angle θh (in the case of 360° or more, the value is a remainder as a result of division by 360) is set as a correction angle θa. Then, the value obtained by adding this correction angle θa to each of energization angles $\theta_M[i]$ (where $1 \le i \le L$) of the above-mentioned basic energization patterns (the value is a remainder as a result of division by 360) is determined as a final energization angle.

FIG. 13B shows the case of four types of hold angles θh including 0 degree, 90 degrees, 180 degrees, and 270 degrees. In this case, correction angles θa are 210 degrees, 300 degrees, 30 degrees, and 120 degrees. Thus, the final energization angle can be calculated by $(\theta_M[i]+\theta a)\mod 360$ with respect to each integer i that satisfies the condition of $1 \le i \le L$.

As shown in FIG. 13B, when energization angle $\theta_M[i]$ at each time is set in accordance with hold angle θh, the voltage applied to each phase of the stator winding at the 1st time for initial position estimation and the voltage applied to the corresponding phase of the stator winding at the last time before starting initial position estimation are different in polarity from each other, or at least one of these voltages is zero. As a result, the influence of residual magnetism can be reduced.

Procedure of Controlling Three-Phase Motor

Figure 14:
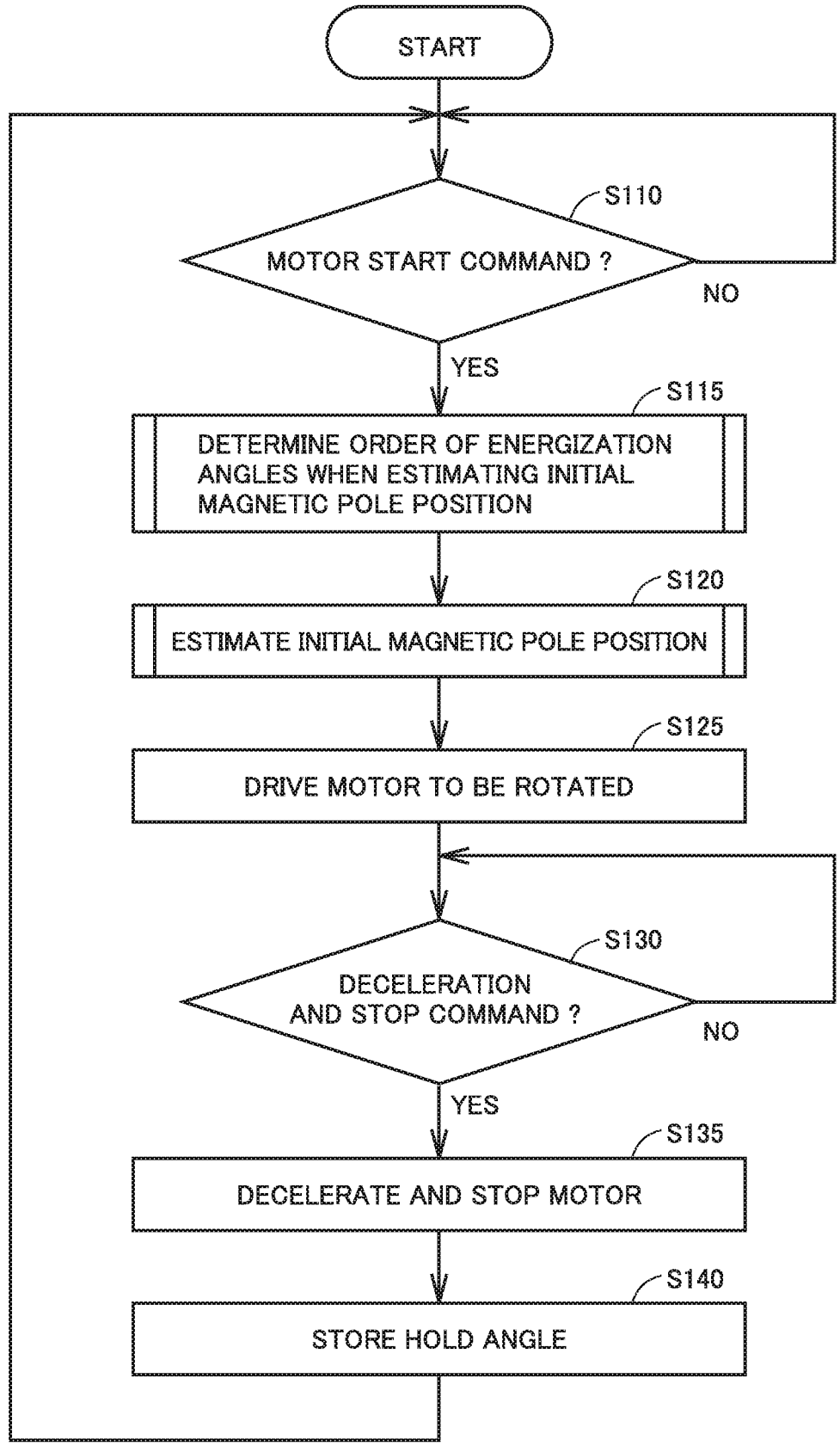
FIG. 14 is a flowchart illustrating a procedure of controlling a three-phase motor in the first embodiment.
Figure 15:
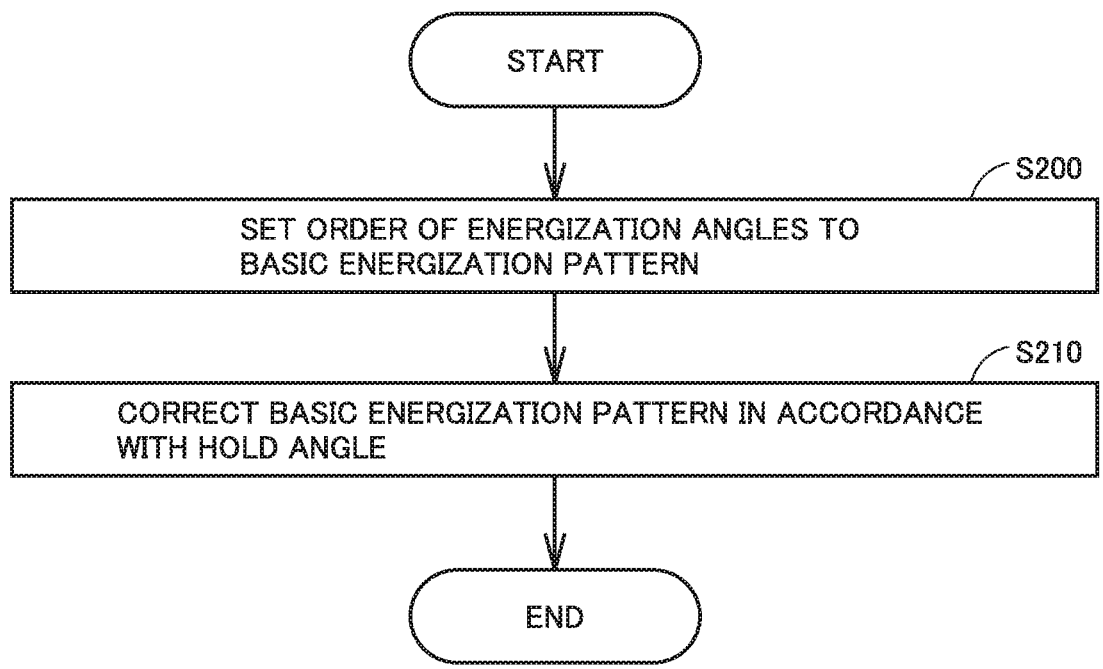
FIG. 15 is a flowchart illustrating the procedure in step S115 in FIG. 14.

FIG. 14 is a flowchart illustrating a procedure of controlling a three-phase motor in the first embodiment. FIG. 15 is a flowchart illustrating the procedure in step S115 in FIG. 14. Mainly referring to FIGS. 14 and 15, a method of controlling a motor according to the first embodiment will be summarized as follows.

Referring to FIG. 14, first, sensorless vector control circuit 50 in FIG. 5 receives a motor start command from high-order control circuit 60 (YES in step S110). Thereby, initial position estimation unit 57 in FIG. 5 included in sensorless vector control circuit 50 determines the order of energization angles that is employed when estimating the initial magnetic pole position in step S115. A specific procedure is shown in FIG. 15.

In step S200 in FIG. 15, initial position estimation unit 57 first sets the order of energization angles as basic energization patterns. As the basic energization patterns, the patterns described with reference to FIGS. 10A, 11A, 12A, and 13A can be used, for example. It can be determined in advance which basic energization pattern is used.

In the next step S210, based on the hold angle at the time when the motor is decelerated and stopped at the last time before starting initial position estimation, initial position estimation unit 57 corrects each of energization angles $\theta_M[i]$ in the basic energization patterns. The specific procedure is the same as those described with reference to FIGS. 10B, 11B, 12B, and 13B, for example.

Again referring to FIG. 14, in the next step S120, initial position estimation unit 57 estimates the initial position of the magnetic pole of the rotor. An example of the specific procedure will be described later with reference to FIGS. 16 and 17.

In the next step S125, sensorless vector control circuit 50 starts to drive the motor to be rotated. Specifically, sensorless vector control circuit 50 starts rotation of the rotor by applying a voltage to the stator winding at an electrical angle at which appropriate torque is applied to the rotor based on the initial magnetic pole position estimated by initial position estimation unit 57. Then, based on a magnetic pole position $\theta_M$ and a rotation angle speed $\omega_M$ estimated by magnetic pole position estimation unit 56 in FIG. 4, sensorless vector control circuit 50 controls drive circuit 40 such that the motor rotates based on an angle speed command value $\omega^*$ received from high-order control circuit 60.

When sensorless vector control circuit 50 receives a deceleration and stop command from high-order control circuit 60 (YES in step S130), it gradually reduces the rotation speed of the rotor according to angle speed command value $\omega^*$ (step S135). Sensorless vector control circuit 50 causes memory to store, as a hold angle, the electrical angle corresponding to the last voltage command value by deceleration and stop control (step S140). As described in step S115, the hold angle is utilized for determining the order of energization angles in the initial magnetic pole position estimation performed before restarting the motor. Each of the above-mentioned steps will be subsequently repeated.

Figure 16:
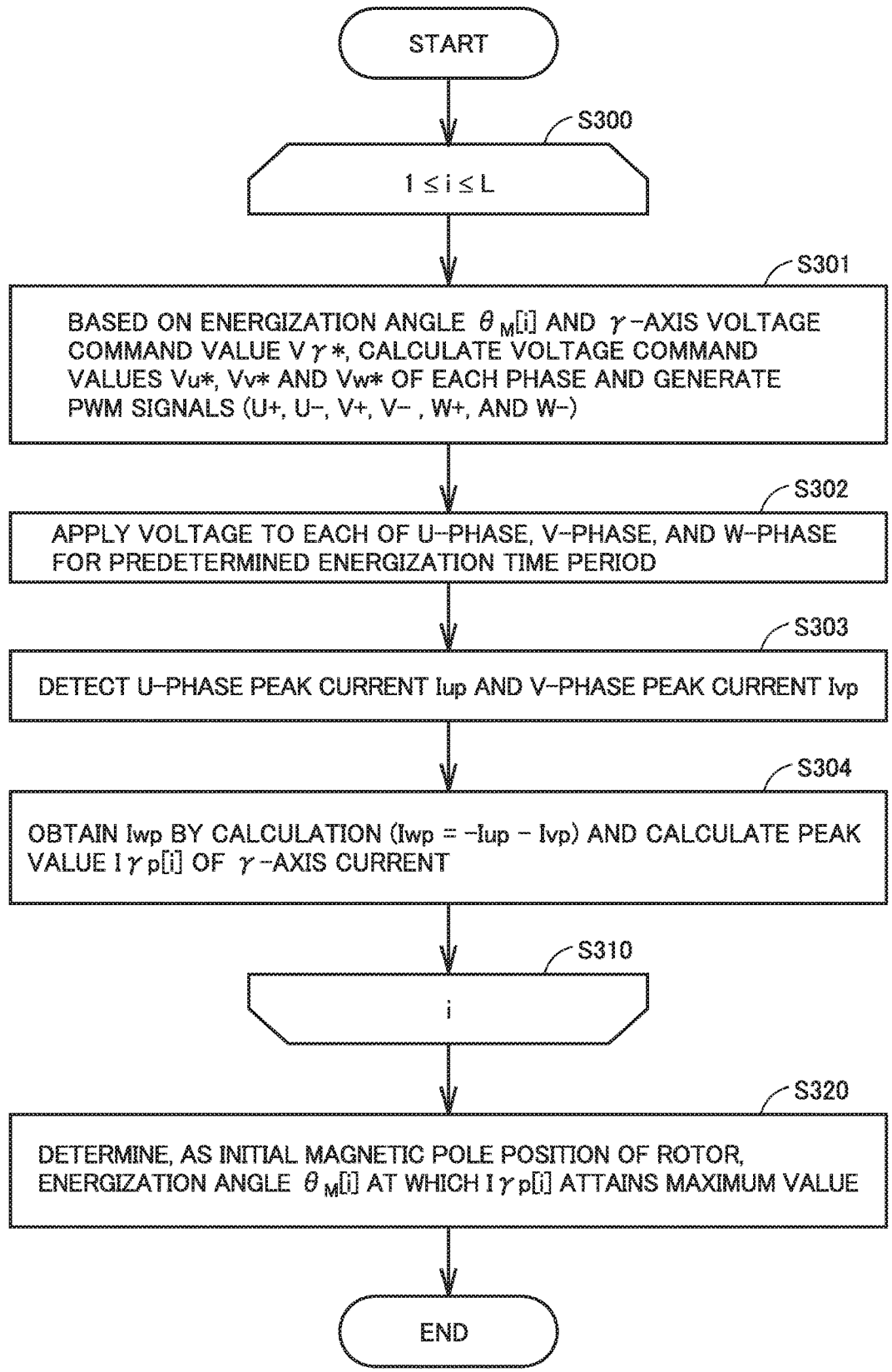
FIG. 16 is a flowchart illustrating an example of initial magnetic pole position estimation shown in step S120 in FIG. 14.

FIG. 16 is a flowchart illustrating an example of initial magnetic pole position estimation shown in step S120 in FIG. 14. The method of estimating an initial magnetic pole position shown in FIG. 16 is to set the energization time period at each energization angle and the command value for the γ-axis voltage to be constant to detect a peak value of the γ-axis current within an energization time period. In this case, it is determined that the energization angle at which the peak value attains a maximum value (that is, the energization angle at which the effective inductance attains a minimum value) is determined as the magnetic pole direction.

Referring to FIGS. 5 and 16, before starting the initial position estimation procedure, a γ-axis voltage command value Vγ*, the time period of applying a voltage to stator winding 31 at each energization angle $\theta_M$ (that is, the energization time period), and the total number of times of energization L are set in advance. The parameter at which the number of times of energization is counted is defined as i. The initial value of i is 1, in which steps S300 to S310 are repeated until i becomes equal to L (i=L). Also, energization angle $\theta_M[i]$ corresponding to the number of times of energization i is set in step S115 in FIG. 14.

In step S301, based on the cosine value and the sine value at energization angle $\theta_M[i]$ corresponding to parameter i and also on γ-axis voltage command value Vγ* that is set in advance, coordinate transformation unit 53 in FIG. 5 calculates U-phase voltage command value Vu*, V-phase voltage command value Vv*, and W-phase voltage command value Vw*. Furthermore, PWM conversion unit 54 generates inverter drive signals U+, U−, V+, V−, W+, and W−, each of which is a PWM signal.

In the next step S302, based on the above-mentioned inverter drive signals U+, U−, V+, V−, W+, and W−, inverter circuit 41 in drive circuit 40 applies pulse-width-modulated U-phase voltage $U_M$, V-phase voltage $V_M$, and W-phase voltage $W_M$ to each phase of stator winding 31 of brushless DC motor 30 for a predetermined energization time period.

In the next step S303, U-phase current detection circuit 43U and V-phase current detection circuit 43V in FIG. 1 detect a U-phase peak current Iup and a V-phase peak current Ivp, respectively, within the energization time period. The value of U-phase current Iu and the value of V-phase current Iv at the end of the energization time period can be defined as U-phase peak current Iup and V-phase peak current Ivp, respectively.

In the next step S304, coordinate transformation unit 55 calculates a W-phase peak current Iwp from U-phase peak current Iup and V-phase peak current Ivp according to Iwp=−Iup−Ivp. Based on energization angle $\theta_M[i]$, coordinate transformation unit 55 calculates a peak current Iγp of the γ-axis and a peak current Iδp of the δ-axis from peak currents Iup, Ivp, and Iwp of each phase by coordinate transformation.

The above-described steps S301 to S304 are repeated L times that correspond to the number of times of energization. Then, in the next step S320, initial position estimation unit 57 determines, as an initial position θ of the magnetic pole of the rotor, energization angle $\theta_M[i]$ at which a peak value Iγp[i] of the γ-axis current calculated in the above-mentioned step S304 attains a maximum value. As above, the procedure of estimating an initial magnetic pole position ends.

Figure 17:
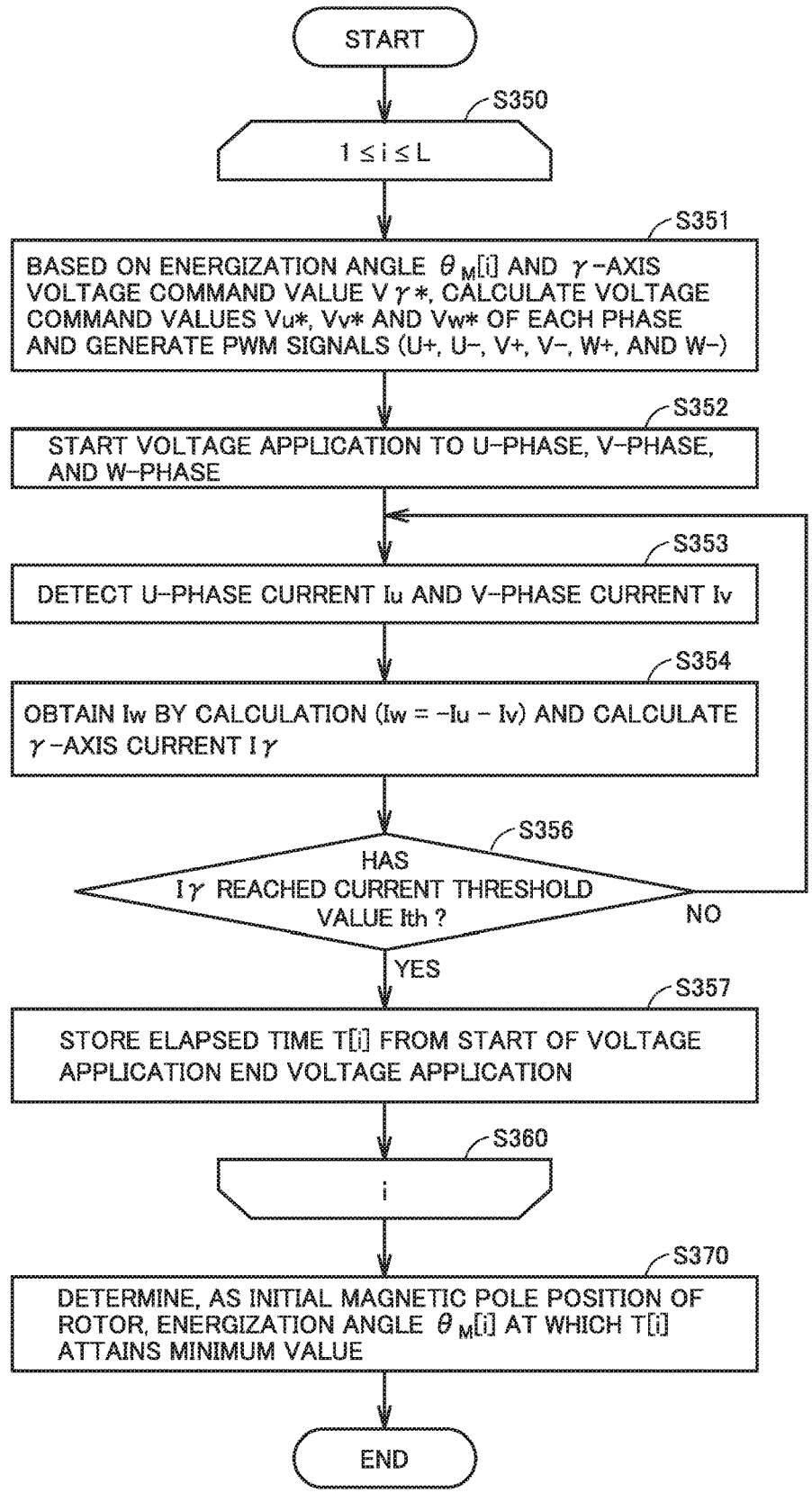
FIG. 17 is a flowchart illustrating another example of initial magnetic pole position estimation shown in step S120 in FIG. 14.

FIG. 17 is a flowchart illustrating another example of initial magnetic pole position estimation shown in step S120 in FIG. 14. The method of estimating an initial magnetic pole position shown in FIG. 17 is to measure the time period from when energization is started to when the γ-axis current reaches a predetermined current threshold value. In this case, the energization angle corresponding to the magnetic pole position of the rotor is observed in the case where the γ-axis current reaches a current threshold value in the shortest time period, that is, in the case where the lowest inductance occurs.

Referring to FIGS. 5 and 17, before starting the procedure of estimating an initial position, γ-axis voltage command value Vγ*, the total number of times of energization L, and the current threshold value at each number of times of energization are set in advance. The parameter at which the number of times of energization is counted is defined as i. The initial value of i is 1, in which steps S350 to S360 are repeated until i becomes equal to L (i=L). Furthermore, energization angle $\theta_M[i]$ corresponding to the number of times of energization i is set in step S115 in FIG. 14.

In step S351, based on the cosine value and the sine value at energization angle $\theta_M[i]$ corresponding to parameter i and also based on γ-axis voltage command value Vγ* that is set in advance, coordinate transformation unit 53 in FIG. 5 calculates U-phase voltage command value Vu*, V-phase voltage command value Vv*, and W-phase voltage command value Vw*. Furthermore, PWM conversion unit 54 generates inverter drive signals U+, U−, V+, V−, W+, and W−, each of which is a PWM signal.

In the next step S352, based on the above-mentioned inverter drive signals U+, U−, V+, V−, W+, and W−, inverter circuit 41 of drive circuit 40 starts application of the pulse-width-modulated U-phase voltage $U_M$, V-phase voltage $V_M$, and W-phase voltage $W_M$ to each phase of stator winding 31 of brushless DC motor 30.

In the next step S353, U-phase current detection circuit 43U and V-phase current detection circuit 43V in FIG. 1 detect U-phase current Iu and V-phase current Iv, respectively.

In the next step S354, coordinate transformation unit 55 calculates W-phase current Iw based on U-phase current Iu and V-phase current Iv according to Iw=−Iu−Iv. Based on energization angle $\theta_M[i]$, coordinate transformation unit 55 calculates γ-axis current Iγ and δ-axis current Iδ by coordinate transformation from currents Iu, Iv, and Iw in each phase.

In the next step S356, initial position estimation unit 57 determines whether γ-axis current Iγ has reached a current threshold value Ith or not. When γ-axis current Iγ is smaller than current threshold value Ith (NO in step S356), the above-mentioned steps S353 and S354 are repeated. When γ-axis current Iγ is equal to or greater than current threshold value Ith (YES in step S356), initial position estimation unit 57 proceeds the process to step S357. In step S357, initial position estimation unit 57 stores elapsed time T[i] from the start of energization, and then ends application of the voltage to the stator winding by drive circuit 40.

The above-described steps S351 to S357 are repeated L times that correspond to the number of times of energization. Then, in the next step S370, initial position estimation unit 57 determines, as initial position θ of the magnetic pole of the rotor, energization angle $\theta_M[i]$ at which elapsed time T[i] from the start of energization stored in the above-mentioned step S357 attains a minimum value. As above, the procedure of estimating an initial magnetic pole position ends.

It should be noted that the method of setting the order of energization angles as described in the present embodiment is applicable also to the method of estimating an initial magnetic pole position other than those described with reference to FIGS. 16 and 17.

[Effects in First Embodiment]

As described above, when the motor control device in the first embodiment estimates the initial magnetic pole position of the three-phase motor in an inductive sensing scheme, the motor control device causes the drive circuit to apply a voltage to the stator winding at each of L electrical angles different from one another (where L is an integer equal to or greater than 5) while changing the L electrical angles. In this case, the absolute value of the difference between the electrical angle of the voltage applied to the stator winding at the i-th time (where 2≤i≤L) and the electrical angle of the voltage applied to the stator winding at the i−1st time is equal to or greater than 180−360/L degrees and equal to or less than 180+360/L degrees. Also, the absolute value of the difference between the electrical angle of the voltage applied to the stator winding at the 1st time for initial position estimation and the electrical angle of the voltage applied to the stator winding at the last time before starting initial position estimation is equal to or greater than 180−360/L degrees and equal to or less than 180+360/L degrees.

Particularly when L electrical angles are set at angles obtained by dividing 360 degrees equally into L segments, the above-mentioned absolute value of the difference between the electrical angles is 180°, or 180°−360°/L, or 180°+360°/L.

By setting the electrical angle of the voltage applied to the stator winding for initial position estimation as described above, the voltage applied to each phase of the stator winding at the i-th time (2≤i≤L) for initial position estimation and the voltage applied to the corresponding phase of the stator winding at the i−1st time (that is, the voltages of the same phase) are different in polarity from each other, or at least one of these voltages is zero, or these voltages are identical in polarity but each have a relatively small magnitude. As a result, the influence of residual magnetism can be reduced as much as possible.

Similarly, the voltage applied to each phase of the stator winding at the 1st time for initial position estimation and the voltage applied to the corresponding phase of the stator winding at the last time before starting initial position estimation are different in polarity from each other, or at least one of these voltages is zero, or these voltages are identical in polarity but each have a relatively small magnitude. As a result, the influence of residual magnetism can be reduced as much as possible.

According to the above-described method of estimating an initial magnetic pole position, a voltage does not need to be applied for the purpose of reducing residual magnetism except for voltage application for the purpose of detecting a change in inductance. Thus, the entire time period required for initial magnetic pole position estimation is not longer than that in the conventional case.

Second Embodiment

The second embodiment will be described with regard to the case where the motor is stopped not by a deceleration stop but by a brake stop or by a free run stop, or the case where the initial position is estimated immediately after power is supplied to the motor control device. In this case, when a voltage is applied to a stator for initial position estimation, the electrical angle of the applied voltage cannot be set using a hold angle. Thus, before starting initial position estimation, the pulse voltage for reducing residual magnetism is applied to the stator winding. This will be hereinafter specifically described with reference to the accompanying drawings.

[Application of Pulse Voltage for Reducing Residual Magnetism in Case of Brake Stop]

Figure 18:
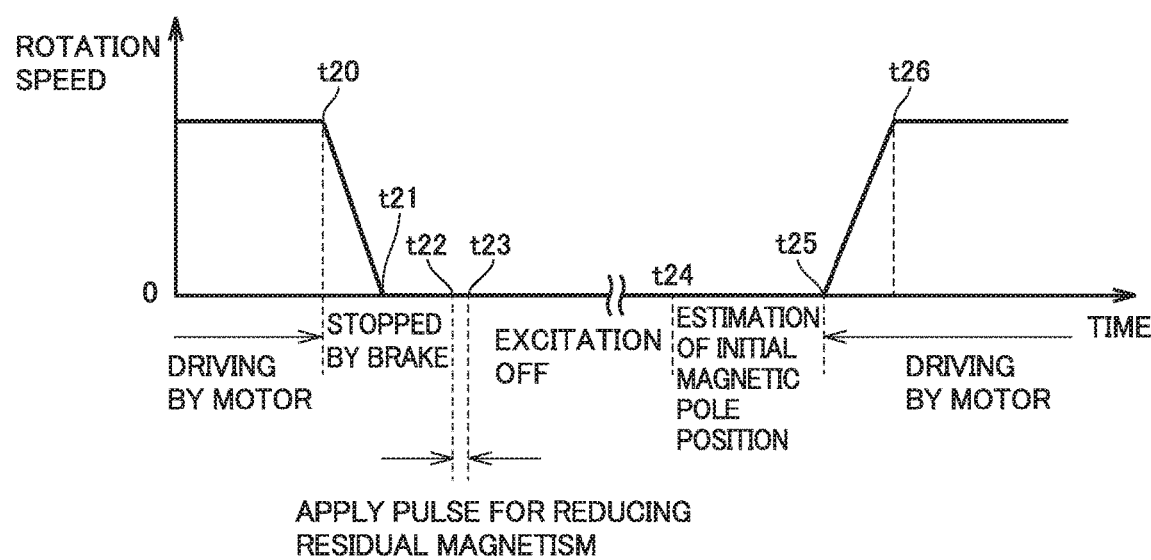
FIG. 18 is a diagram showing a change of a motor rotation speed in a time period from when the motor in a steady operation is braked and stopped to when it is restarted.

FIG. 18 is a diagram showing a change of a motor rotation speed in a time period from when the motor in a steady operation is braked and stopped to when it is restarted. In FIG. 18, the horizontal axis shows time while the vertical axis shows the rotation speed of the motor.

Referring to FIG. 18, the motor is steadily operated in a vector control scheme until a time point t20. In the time period from time point t20 to a time point t21, all of the lower arms or all of the upper arms of inverter circuit 41 in FIG. 1 are controlled to be conductive, so that brushless DC motor 30 is stopped by action of an electromagnetic brake.

From a time point t22 after stopping the rotor to a time point t23, a pulse voltage is applied for reducing residual magnetism. The electrical angle of the pulse voltage is set at an angle different by about 180° from the electrical angle of the applied voltage at the 1st time for the subsequent initial magnetic pole position estimation. For example, when the initial magnetic pole position is estimated by applying a voltage L times, the difference between the electrical angles is set to fall within a range equal to or greater than 180−360/L degrees and equal to or less than 180+360/L degrees. Thereby, the influence of the residual magnetism can be reduced. In a time period from subsequent time point t23 to a time point t24, supply of the exciting current to the stator is stopped.

Then, before restarting the motor from a time point t25, the initial position of the magnetic pole of the rotor is estimated from time point t24 to time point t25. An inductive sensing scheme is used as a method of estimating the initial position of the magnetic pole of the rotor. As having been described in the first embodiment, when the initial magnetic pole position is estimated by applying a voltage L times, it is desirable that the absolute value of the difference between the electrical angle of the voltage applied at the i-th time and the electrical angle of the voltage applied the i−1st time is equal to or greater than 180−360/L degrees and equal to or less than 180+360/L degrees. Thereby, the influence of residual magnetism can be reduced as much as possible.

When rotation of the rotor is started at time point t25, the brushless DC motor is subsequently controlled by a sensorless vector control scheme. The steady operation with a fixed rotation speed is started from a time point t26.

Even when the motor is stopped from time point t20 to time point t21 in FIG. 18 not by a brake stop but by a free run stop by which power supply to the stator winding is interrupted, a pulse voltage for reducing residual magnetism can be applied at the same timing as described above.

[Application of Pulse Voltage for Reducing Residual Magnetism in Case where Power Supply is ON]

Figure 19:
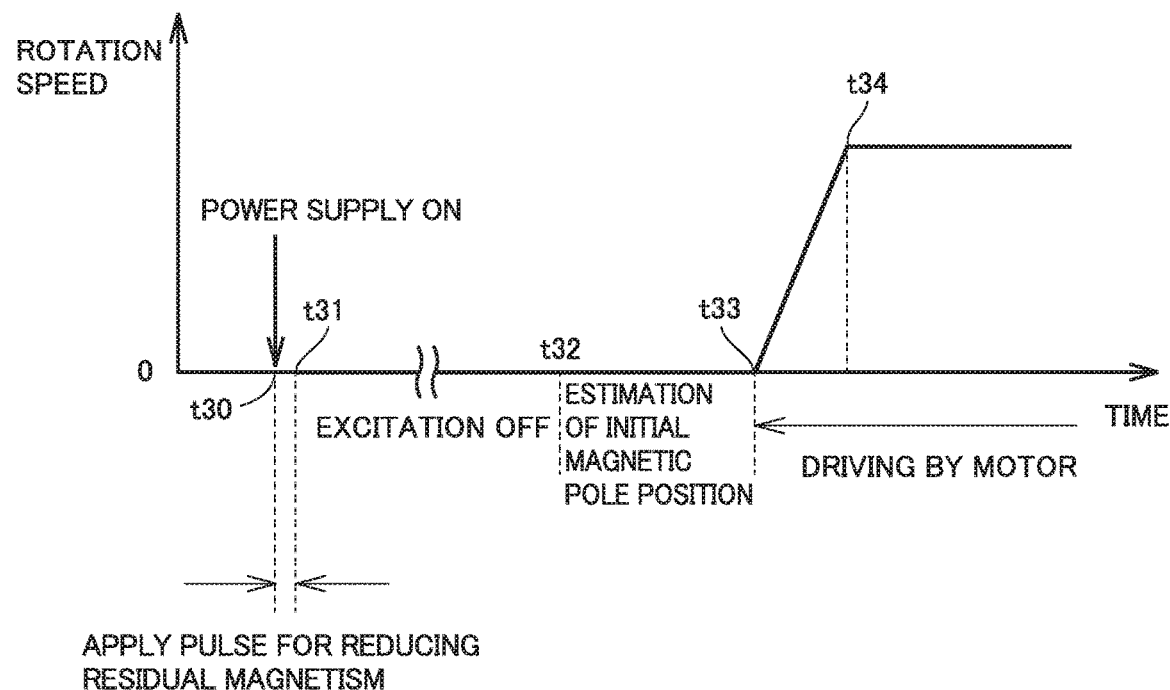
FIG. 19 is a diagram showing a change of the motor rotation speed in a time period from when power supply to the motor control device is turned on to when the motor is brought into a steady operation state.

FIG. 19 is a diagram showing a change of the motor rotation speed in a time period from when power supply to the motor control device is turned on to when the motor is brought into a steady operation state. In FIG. 19, the horizontal axis shows time while the vertical axis shows the rotation speed of the motor.

At a time point t30, the power supply to the motor control device is turned on. From time point t30 after starting the power supply to a time point t31, a pulse voltage is applied for reducing residual magnetism. The electrical angle of the pulse voltage is set at an angle different by about 180° from the electrical angle of the voltage applied at the 1st time for the subsequent initial magnetic pole position estimation. For example, when a voltage is applied L times to thereby estimate the initial magnetic pole position, it is desirable that the difference between the electrical angles is equal to or greater than 180−360/L degrees and equal to or less than 180+360/L degrees. Thereby, the influence of the residual magnetism can be reduced. In a time period from subsequent time point t31 to a time point t32, supply of the exciting current to the stator is stopped.

Then, before restarting the motor from a time point t33, the initial position of the magnetic pole of the rotor is estimated in a time period from time point t32 to time point t33. An inductive sensing scheme is used as a method of estimating the initial position of the magnetic pole of the rotor. As having been described in the first embodiment, when a voltage is applied L times to thereby estimate the initial magnetic pole position, it is desirable that the absolute value of the difference between the electrical angle of the voltage applied at the i-th time and the electrical angle of the voltage applied at the i−1st time is equal to or greater than 180−360/L degrees and equal to or less than 180+360/L degrees. Thereby, the influence of residual magnetism can be reduced as much as possible.

When rotation of the rotor is started at time point t33, the brushless DC motor is subsequently controlled by a sensorless vector control scheme. The steady operation with a fixed rotation speed is started from a time point t34.

[Order of Voltage Application when Estimating Initial Magnetic Pole Position]

FIGS. 20A and 20B each are a diagram showing a specific example of the order of angles for initial magnetic pole position estimation in a motor control device in the second embodiment. FIG. 20A shows basic energization patterns corresponding to those in FIG. 10A. FIG. 20B shows basic energization patterns corresponding to those in FIG. 12A.

Referring to FIG. 20A, the energization angle at each voltage application for initial magnetic pole position estimation is set at the same angle as that in the basic energization patterns in FIG. 10A. In this case, the energization angle at the 1st voltage application is 0 degree.

Furthermore, the electrical angle of the pulse voltage applied for reducing residual magnetism is set at 180 degrees. Thereby, the absolute value of the difference between the electrical angle of the voltage applied to the stator winding at the 1st time for initial position estimation and the electrical angle of the voltage applied to the stator winding at the last time before starting initial position estimation is 180 degrees.

Referring to FIG. 20B, the energization angle at each voltage application for initial magnetic pole position estimation is set at the same angle as that in the basic energization patterns in FIG. 12A. In this case, the energization angle at the 1st voltage application is 0 degree.

Furthermore, the electrical angle of the pulse voltage applied for reducing residual magnetism is set at 210 degrees. Thereby, the absolute value of the difference between the electrical angle of the voltage applied to the stator winding at the 1st time for initial position estimation and the electrical angle of the voltage applied to the stator winding at the last time before starting initial position estimation is 150 degrees. This angle is set to be equal to the absolute value of the difference between the electrical angle of the voltage applied at the i-th time (where 2≤i≤12) and the electrical angle of the voltage applied at the i−1st time. Thereby, the influence of residual magnetism can be reduced as much as possible.

[Procedure of Controlling Three-Phase Motor]

Figure 21:
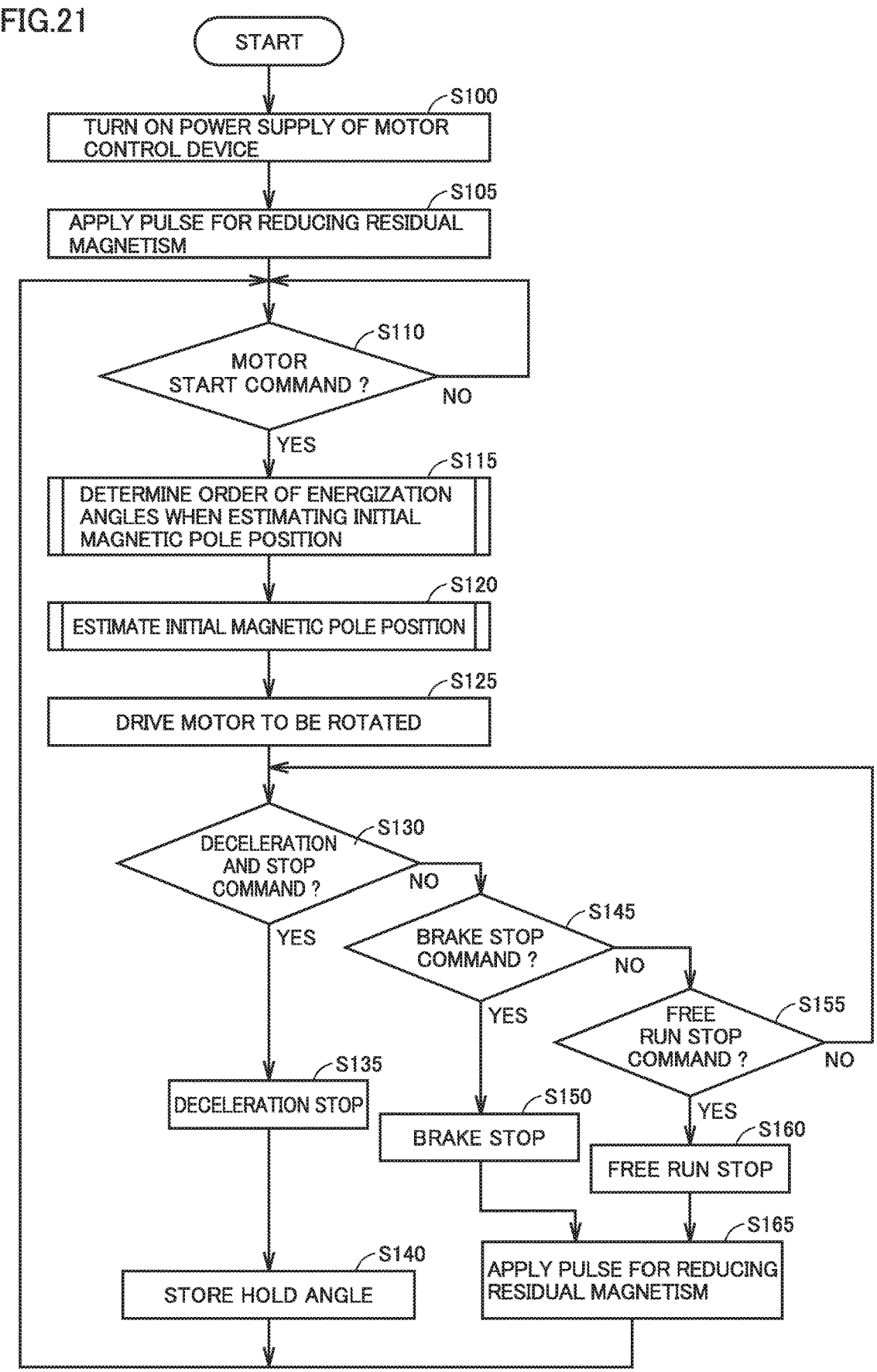
FIG. 21 is a flowchart illustrating a procedure of controlling a three-phase motor in the second embodiment.

FIG. 21 is a flowchart illustrating a procedure of controlling a three-phase motor in the second embodiment. The flowchart in FIG. 21 includes an extension from the flowchart in FIG. 14. In the flowchart in FIG. 21, the steps that are identical or correspond to those in the flowchart in FIG. 14 will be denoted by the same reference characters, detailed description thereof may not be repeated.

Referring to FIG. 21, in step S100, power supply to the motor control device is turned on.

In the next step S105, for reducing residual magnetism, initial position estimation unit 57 in FIG. 5 included in sensorless vector control circuit 50 causes drive circuit 40 to apply a pulse voltage to the stator winding at the voltage level and in the energization time period, each of which is enough to prevent the rotor from rotating. This electrical angle for reducing residual magnetism is set to have an angle difference of about 180 degrees from the energization angle at the 1st time in the basic energization patterns.

Then, sensorless vector control circuit 50 in FIG. 5 receives a start command for the motor from high-order control circuit 60 (YES in step S110). Thereby, initial position estimation unit 57 determines the order of energization angles applied when estimating the initial magnetic pole position in step S115. Specifically, initial position estimation unit 57 sets the order of energization angles at the same order as that in the basic energization patterns described with reference to FIGS. 10A, 11A, 12A, 13A, and the like. In other words, step S200 in FIG. 15 is performed. It can be determined in advance which basic energization pattern is used. Since the hold angle is not stored immediately after power supply to the motor control device is started, step S210 in FIG. 15 is not performed.

In the next step S120, initial position estimation unit 57 estimates the initial position of the magnetic pole of the rotor. An example of a specific procedure is the same as the procedure described with reference to FIGS. 16 and 17.

In the next step S125, sensorless vector control circuit 50 starts to drive the motor to be rotated. Specifically, sensorless vector control circuit 50 starts rotation of the rotor by applying a voltage to the stator winding at an electrical angle at which appropriate torque is applied to the rotor based on the initial magnetic pole position estimated by initial position estimation unit 57. Then, based on rotation angle speed $\omega_M$ and magnetic pole position $\theta_M$ estimated by magnetic pole position estimation unit 56 in FIG. 4, sensorless vector control circuit 50 controls drive circuit 40 such that the motor rotates at angle speed command value ω* given from high-order control circuit 60.

The following is an explanation about the operation of sensorless vector control circuit 50 in the case where a motor stop command is received from high-order control circuit 60. First, when sensorless vector control circuit 50 receives a deceleration and stop command from high-order control circuit 60 (YES in step S130), it gradually reduces the rotation speed of the rotor according to angle speed command value ω* (step S135). Sensorless vector control circuit 50 causes memory to store, as a hold angle, the electrical angle corresponding to the last voltage command value by deceleration and stop control (step S140).

Then, when receiving a motor start command from high-order control circuit 60 (YES in step S110), initial position estimation unit 57 determines the order of energization angles applied when estimating the initial position in step S115. In this case, as described in step S210 in FIG. 15, the hold angle is used for correcting the basic energization patterns.

On the other hand, when sensorless vector control circuit 50 receives a brake stop command from high-order control circuit 60 (NO in step S130 and YES in step S145), it brings all of the lower arms or all of the upper arms in inverter circuit 41 included in drive circuit 40 into conducting states, thereby brake-controlling brushless DC motor 30 (step S150). Thereby, rotation of the rotor is stopped.

In the next step S165, for reducing residual magnetism, initial position estimation unit 57 in sensorless vector control circuit 50 causes drive circuit 40 to apply a pulse voltage to the stator winding at the voltage level and in the energization time period, each of which is enough to prevent the rotor from rotating. This electrical angle for reducing residual magnetism is set to have an angle difference of about 180 degrees from the energization angle at the 1st time in the basic energization patterns.

Then, when initial position estimation unit 57 receives a motor start command from high-order control circuit 60 (YES in step S110), it sets the order of energization angles applied when estimating the initial magnetic pole position in step S115 at the same order as that in the basic energization patterns described with reference to FIGS. 10A, 11A, 12A, 13A and the like (step S200 in FIG. 15). In this case, step S210 in FIG. 15 is not performed.

On the other hand, when sensorless vector control circuit 50 receives a free run stop command from high-order control circuit 60 (NO in step S130, NO in step S145, and YES in step S155), it controls inverter circuit 41 of drive circuit 40 so as to interrupt the power supply to brushless DC motor 30. Thereby, the rotor is brought into a free run state and then stopped (step S160).

Then, in step S165, for reducing residual magnetism, initial position estimation unit 57 of sensorless vector control circuit 50 causes drive circuit 40 to apply a pulse voltage to the stator winding at the voltage level and in the energization time period, each of which is enough to prevent the rotor from rotating. This electrical angle for reducing residual magnetism is set to have an angle difference of about 180 degrees from the energization angle at the 1st time in the basic energization patterns.

Then, when initial position estimation unit 57 receives a motor start command from high-order control circuit 60 (YES in step S110), it sets the order of energization angles applied when estimating the initial magnetic pole position in step S115 at the same order as that in the basic energization patterns described with reference to FIGS. 10A, 11A, 12A, 13A and the like (step S200 in FIG. 15). In this case, step S210 in FIG. 15 is not performed.

Then, in each of the cases of a deceleration stop (YES in step S130), a brake stop (YES in step S145), and a free run stop (YES in step S155), in the next step S120, initial position estimation unit 57 estimates the initial position of the magnetic pole of the rotor. The similar procedure is subsequently repeated.

[Effects in Second Embodiment]

As described above, according to the motor control device in the second embodiment, immediately after the power supply of the motor control device is turned on, or immediately after the motor is stopped by a brake stop or a free run stop, the pulse voltage for reducing residual magnetism is applied to the stator winding. In this case, the electrical angle of the pulse voltage is set at an angle different by about 180 degrees from the electrical angle of the voltage applied at the 1st time for the subsequent initial magnetic pole position estimation. For example, when a voltage is applied L times to thereby estimate the initial magnetic pole position, the difference between the electrical angles is set to fall within a range equal to or greater than 180−360/L degrees and equal to or less than 180+360/L degrees. Thereby, the influence of the residual magnetism can be reduced.

Furthermore, as described with reference to the flowchart in FIG. 21, the pulse voltage for reducing residual magnetism is applied to the stator winding at the timing before a motor start command is received. Thus, a pulse voltage for reducing residual magnetism does not need to be applied after reception of the motor start command, but the initial magnetic pole position can be immediately estimated, which leads to an advantage that the time required to estimate the initial position is not increased even when a voltage pulse is excessively applied.

Third Embodiment

The third embodiment will be described with regard to an example in which a current detection value for estimating the initial magnetic pole position is corrected in order to improve the accuracy of estimating the initial magnetic pole position. Specifically, when energization is performed L times while changing the electrical angle, initial position estimation unit 57 corrects the detection value of the current of the stator winding, which is based on the i-th voltage application, in accordance with the difference between the electrical angle of the voltage applied at the k-th time (where 2≤k≤L) and the electrical angle of the voltage applied at the k−1st time.

The third embodiment is applicable to each of the first embodiment and the second embodiment. The specific configuration of the motor control device is the same as that having been described in the first embodiment.

Specific Example of Method of Correcting Current Detection Value

FIGS. 22A and 22B each are a diagram for illustrating an example of a current correction value in a motor control device in the third embodiment. FIG. 22A shows, in tabular form, an example of the current correction values corresponding to the basic energization patterns described with reference to FIG. 10A. FIG. 22B shows, in tabular form, an example of the current correction values corresponding to the basic energization patterns described with reference to FIG. 11A. In FIGS. 22A and 22B, energization angle $\theta_M[0]$ at the 0-th time is assumed to correspond to the hold angle in the first embodiment or the electrical angle of the pulse voltage for reducing residual magnetism in the second embodiment.

Referring to FIG. 22A, when the difference between electrical angle $\theta_M[i]$ of the voltage applied at the i-th time (where $1 \leq i \leq 12$) and electrical angle $\theta_M[i-1]$ of the voltage applied at the i-1st time (that is, $(\theta_M[i]-\theta_M[i-1])$mod 360) is 180 degrees, the current correction value is zero, so that correction for the current detection value is not performed.

When the difference between electrical angles $(\theta_M[i]-\theta_M[i-1])$mod 360 is 210 degrees, it is considered that the influence of residual magnetism is greater than that in the case of 180 degrees. Thus, an amount of the current increased by the influence of the residual magnetism is subtracted from the current detection value. FIG. 22A shows an increased amount of the current as 0.1[A] by way of example, which is however experimentally set in practice.

Referring to FIG. 22B, when the difference between electrical angle $\theta_M[i]$ of the voltage applied at the i-th time (where $1 \leq i \leq 12$) and electrical angle $\theta_M[i-1]$ of the voltage applied at the i-1st time (that is, $(\theta_M[i]-\theta_M[i-1])$mod 360) is 180 degrees, the current correction value is zero, so that correction for the current detection value is not performed.

When the difference between the electrical angles $(\theta_M[i]-\theta_M[i-1])$mod 360 is 150 degrees, it is considered that the influence of residual magnetism is greater than that in the case of 180 degrees. Thus, an amount of the current increased by the influence of residual magnetism is subtracted from the current detection value. FIG. 22B shows an increased amount of the current as 0.1[A] by way of example, which is however experimentally set in practice.

[Procedure of Estimating Initial Magnetic Pole Position]

The following is an explanation about an example in which the step of correcting a current detection value is included in the procedure of estimating an initial magnetic pole position described with reference to FIGS. 16 and 17.

Figure 23:
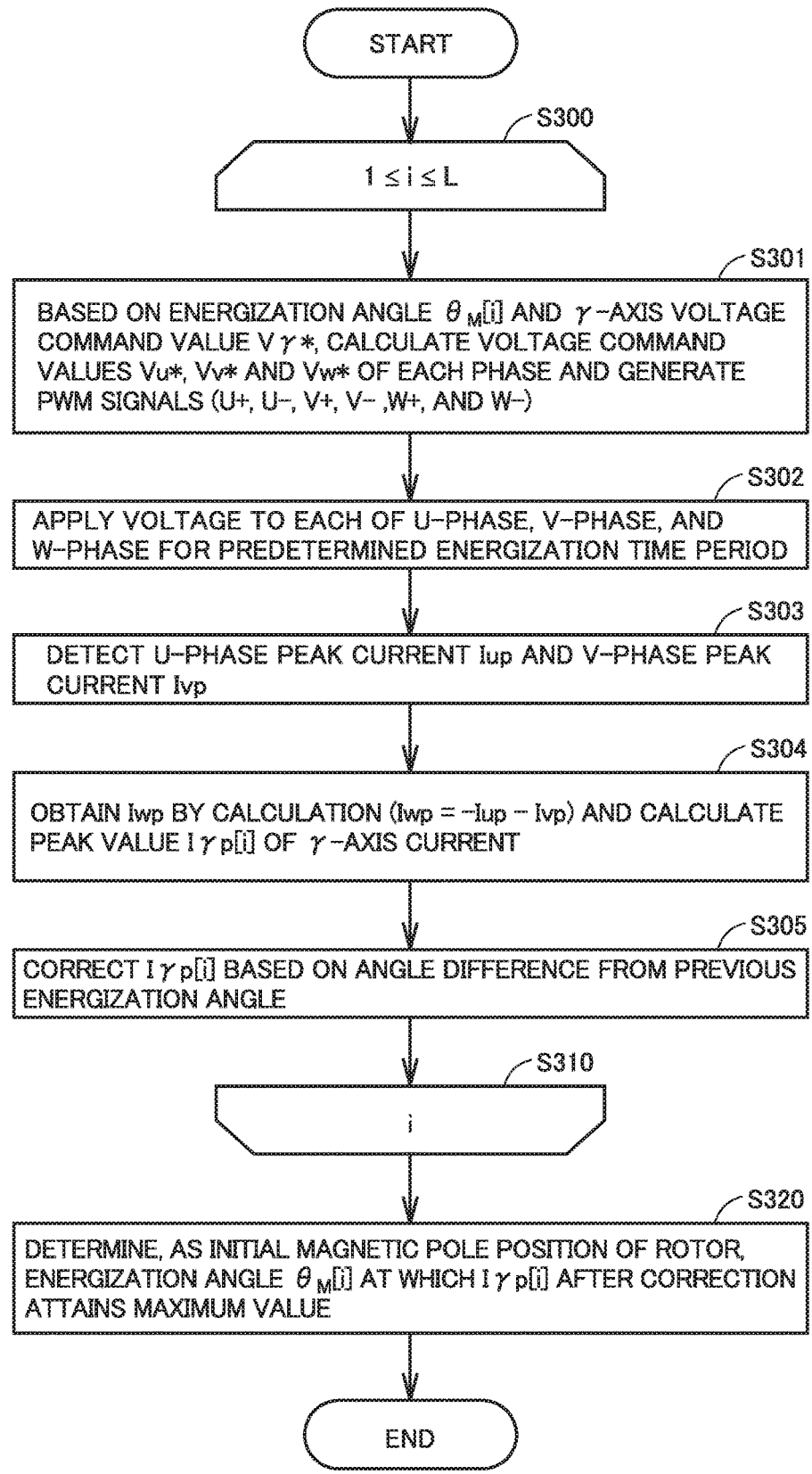
FIG. 23 is a flowchart illustrating an example of a procedure of estimating an initial magnetic pole position in the motor control device in the third embodiment.

FIG. 23 is a flowchart illustrating an example of the procedure of estimating an initial magnetic pole position in the motor control device in the third embodiment. The flowchart in FIG. 23 corresponds to the flowchart in FIG. 16. In FIG. 23, the steps that are identical or correspond to those in FIG. 16 will be denoted by the same reference characters, and detailed description thereof will not be repeated.

Referring to FIGS. 5 and 23, a voltage is applied to the stator winding at the i-th (where $1 \leq i \leq L$) energization angle $\theta_M[i]$ among the total number of times of energization L (steps S301 and S302). Based on the detection values of U-phase peak current Iup and V-phase peak current Ivp (step S303) within the energization time period, coordinate transformation unit 55 calculates peak value I$\gamma$p[i] of the $\gamma$-axis current (step S304).

In the next step S305, in accordance with the angle difference between the i-th energization angle $\theta_M[i]$ and its preceding i-1st energization angle $\theta_M[i-1]$, initial position estimation unit 57 corrects peak value I$\gamma$p[i] of the $\gamma$-axis current obtained by the i-th energization. In addition, the 0th energization angle $\theta_M[0]$ corresponds to the hold angle in the first embodiment or the electrical angle of the pulse voltage for reducing residual magnetism in the second embodiment.

Specifically, when the absolute value of the angle difference between the i-th energization angle $\theta_M[i]$ and its preceding i-1st energization angle $\theta_M[i-1]$ is 180 degrees, initial position estimation unit 57 does not correct the calculation result of peak value I$\gamma$p[i] of the $\gamma$-axis current. On the other hand, when the absolute value of the angle difference between the i-th energization angle $\theta_M[i]$ and its preceding i-1st energization angle $\theta_M[i-1]$ is different from 180 degrees, initial position estimation unit 57 corrects peak value I$\gamma$p[i] of the $\gamma$-axis current to be reduced.

The above-mentioned steps S301 to S305 are repeated L times that correspond to the number of times of energization. Then, in the next step S320, initial position estimation unit 57 determines, as initial position $\theta$ of the magnetic pole of the rotor, energization angle $\theta_M[i]$ at which peak value I$\gamma$p[i] of the $\gamma$-axis current after correction that is calculated in the above-mentioned step S305 attains a maximum value. As above, the procedure of estimating an initial magnetic pole position ends.

Figure 24:
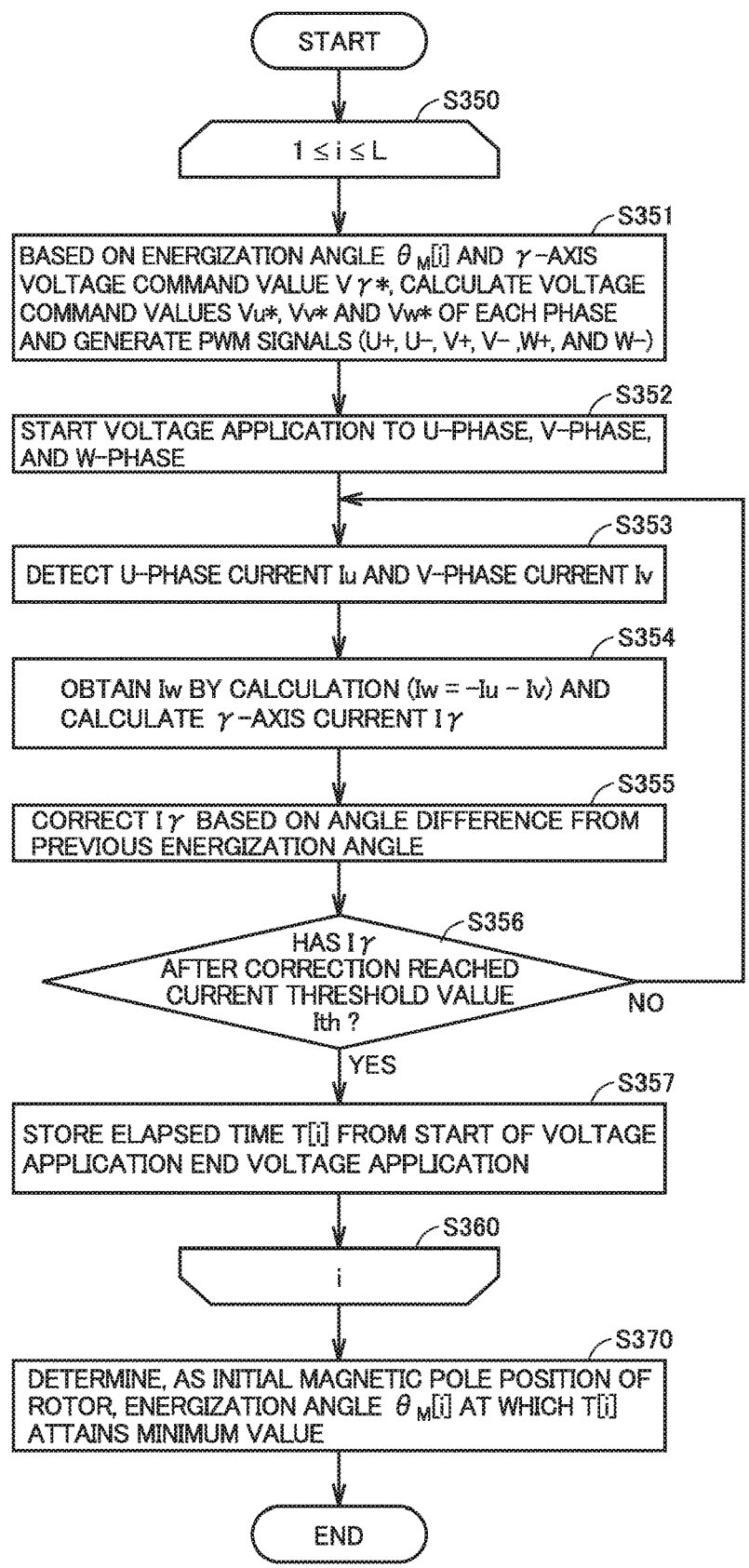
FIG. 24 is a flowchart illustrating another example of the procedure of estimating an initial magnetic pole position in the motor control device in the third embodiment.

FIG. 24 is a flowchart illustrating another example of the procedure of estimating an initial magnetic pole position in the motor control device in the third embodiment. The flowchart in FIG. 24 corresponds to the flowchart in FIG. 17. In FIG. 24, the steps that are identical or correspond to those in FIG. 17 will be denoted by the same reference characters, and detailed description thereof will not be repeated.

Referring to FIGS. 5 and 24, a voltage is applied to the stator winding at the i-th (where $1 \leq i \leq L$) energization angle $\theta_M[i]$ among the total number of times of energization L (steps S351 and S352). Based on the detection values of U-phase current Iu and V-phase current Iv during energization (step S353), coordinate transformation unit 55 calculates $\gamma$-axis current I$\gamma$ (step S354).

In the next step S355, the calculated value of $\gamma$-axis current I$\gamma$ is corrected in accordance with the angle difference between the i-th energization angle $\theta_M[i]$ and its preceding i-1st energization angle $\theta_M[i-1]$. In addition, the 0-th energization angle $\theta_M[0]$ is assumed to correspond to the hold angle in the first embodiment or the electrical angle of the pulse voltage for reducing residual magnetism in the second embodiment.

Specifically, when the absolute value of the angle difference between the i-th energization angle $\theta_M[i]$ and its preceding i-1st energization angle $\theta_M[i-1]$ is 180 degrees, initial position estimation unit 57 does not correct the calculation result of $\gamma$-axis current I$\gamma$. On the other hand, when the absolute value of the angle difference between the i-th energization angle $\theta_M[i]$ and its preceding i-1st energization angle $\theta_M[i-1]$ is different from 180 degrees, initial position estimation unit 57 corrects the value of $\gamma$-axis current I$\gamma$ to be reduced.

In the next step S356, initial position estimation unit 57 determines whether $\gamma$-axis current I$\gamma$ after correction has reached current threshold value Ith or not. Specifically, when initial position estimation unit 57 does not perform a correction, it determines using the calculated $\gamma$-axis current I$\gamma$ whether $\gamma$-axis current I$\gamma$ has reached current threshold value Ith or not.

When $\gamma$-axis current I$\gamma$ is smaller than current threshold value Ith (NO in step S356) as a result of the above-mentioned determination, the above-mentioned steps S353 to S355 are repeated. When $\gamma$-axis current I$\gamma$ becomes equal to or greater than current threshold value Ith (YES in step S356), initial position estimation unit 57 proceeds the process to step S357. In step S357, initial position estimation unit 57 stores elapsed time T[i] from the start of energization and ends voltage application to the stator winding at energization angle $\theta_M[i]$ by drive circuit 40.

The above-mentioned steps S351 to S357 are repeated L times that correspond to the number of times of energization. Then, in the next step S370, initial position estimation unit 57 determines, as an initial position $\theta$ of the magnetic pole of the rotor, energization angle $\theta_M[i]$ at which elapsed time T[i] from the start of energization stored in the above-mentioned step S357 attains a minimum value. As above, the procedure of estimating the initial magnetic pole position ends.

[Effects in Third Embodiment]

As described above, according to the motor control device in the third embodiment, when energization is performed L times while changing the electrical angle during the initial magnetic pole position estimation, the detection value of the stator winding current produced by the i-th voltage application is corrected in accordance with the difference between electrical angle $\theta_M[i]$ of the voltage applied at the i-th time (where $1 \leq i \leq L$) and electrical angle $\theta_M[i-1]$ of the voltage applied at the i−1st time. Thereby, the accuracy of estimating the initial magnetic pole position can be improved.

Fourth Embodiment

The fourth embodiment will be described with regard to an example in which the motor control device described in each of the first to third embodiments is used for controlling each of motors for driving their respective rollers in an electrophotographic-type image forming apparatus.

Configuration Example of Image Forming Apparatus

Figure 25:
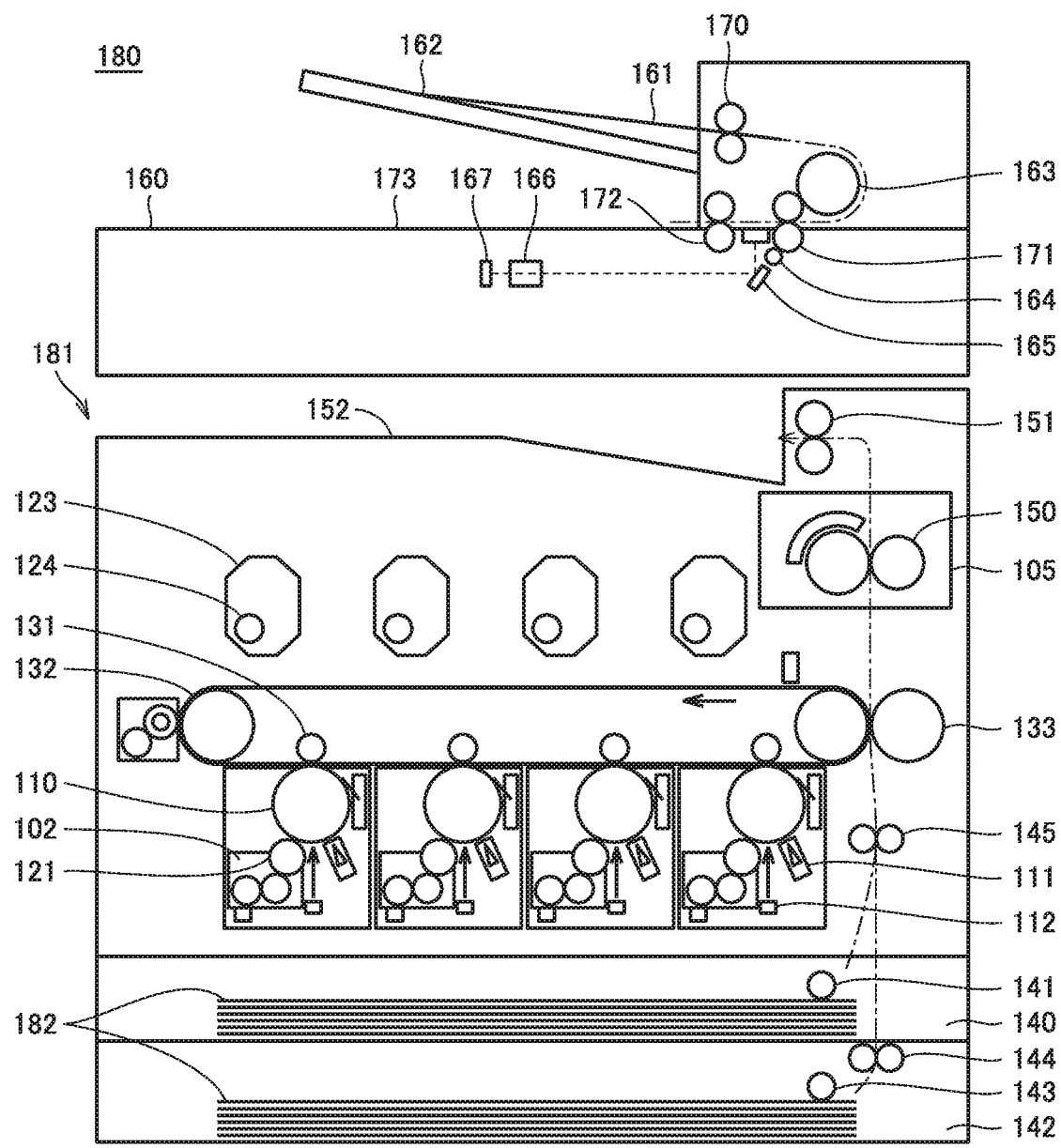
FIG. 25 is a cross-sectional view showing an example of the configuration of an image forming apparatus.

FIG. 25 is a cross-sectional view showing an example of the configuration of an image forming apparatus. It should be noted that the cross-sectional view in FIG. 25 is merely schematically shown and may be partially enlarged or modified in aspect ratio in order to simplify the illustration.

Referring to FIG. 25, an image forming apparatus 180 includes an imaging unit 181 configured as a tandem color printer, a paper feed mechanism 182, and a document reading device 160. Image forming apparatus 180 may be configured as a multifunctional peripheral (MFP) connected to a network and having functions as a printer, a scanner, a copy machine, a facsimile machine, and the like.

Imaging unit 181 includes four photoreceptor cartridges 191, 192, 193, 194, a primary transfer roller 131, a transfer belt 132, a toner bottle 123, a secondary transfer roller 133, and a fixing device 105.

Photoreceptor cartridges 191, 192, 193, 194 form toner images of four colors including yellow (Y), magenta (M), cyan (C), and black (K), respectively. Each of photoreceptor cartridges 191, 192, 193, 194 includes a cylindrical photoreceptor 110, a charging unit 111, an image exposure device 112 including a light source, and a developing device 102 including a developing roller 121.

Charging unit 111 uniformly charges the surface of photoreceptor 110 at a prescribed potential. Image exposure device 112 causes the image corresponding to a document image to be exposed to the charged region of photoreceptor 110. Thereby, an electrostatic latent image is formed on photoreceptor 110. Using developing roller 121 to which developing bias is applied, developing device 102 causes toner to adhere to the electrostatic latent image, thereby forming a visible toner image.

Also, four toner bottles 123 are provided corresponding to their respective photoreceptor cartridges 191, 192, 193, and 194. Toner is supplied from toner bottles 123 to their respective photoreceptor cartridges. A stirring fin 124 for stirring toner is provided inside each of toner bottles 123.

Four primary transfer rollers 131 are provided so as to face their respective four photoreceptors 110. Each of photoreceptors 110 and a corresponding one of primary transfer rollers 131 are pressed against each other with transfer belt 132 interposed therebetween. Furthermore, a bias for attracting toner is applied to each primary transfer roller 131. Thereby, the visible toner image on the surface of photoreceptor 110 after development is transferred onto transfer belt 132.

The visible toner image transferred onto transfer belt 132 is conveyed to the position of secondary transfer roller 133. A transfer voltage is also applied to secondary transfer roller 133 in the same manner as with the primary transfer roller. Thereby, the visible toner image conveyed by transfer belt 132 is transferred onto a sheet of paper as a recording medium 183 at a nip portion between secondary transfer roller 133 and transfer belt 132.

The visible toner image transferred onto recording medium 183 is conveyed to fixing device 105. Fixing device 105 has a fixing roller 150 and uses this fixing roller 150 to heat and pressurize recording medium 183, thereby fixing the visible toner image on recording medium 183. Recording medium 183 after fixation is discharged by a paper discharge roller 151 onto a paper discharge tray 152.

Paper feed mechanism 182 takes in a sheet of paper as recording medium 183 from paper feed cassettes 140 and 142, and then conveys the sheet of paper to secondary transfer roller 133. Paper feed mechanism 182 includes paper feed cassettes 140, 142, paper feed rollers 141, 143, a conveyance roller 144, and a timing roller 145.

Recording media 183 housed in paper feed cassette 140 in the first stage are taken out one by one by paper feed roller 141 and conveyed to timing roller 145. Recording media 183 housed in paper feed cassette 142 in the second stage are taken out one by one by paper feed roller 143 and conveyed through conveyance roller 144 to timing roller 145.

Timing roller 145 stops the supplied recording medium 183, thereby adjusting: the timing at which the visible toner image transferred onto transfer belt 132 is conveyed to secondary transfer roller 133; and the timing at which recording medium 183 is supplied to secondary transfer roller 133.

Document reading device 160 reads the document image on a document sheet 161, to thereby generate image data. In the example shown in FIG. 25, document reading device 160 is provided above imaging unit 181. Document reading device 160 includes a document platen 162, a paper feed roller 170, document conveyance rollers 163, 171, a document discharge roller 172, a paper discharge tray 173, a light source 164, a mirror 165, a lens 166, and an image sensor 167 such as a charged-coupled device (CCD).

Document sheets 161 placed on document platen 162 are taken in one by one by paper feed roller 170. Document sheet 161 is conveyed by document conveyance rollers 163 and 171, and thereby, reaches a document reading position.

At the document reading position, light source 164 applies light upon the document image on document sheet 161. The light reflected on the surface of document sheet 161 is reflected by mirror 165, and thereafter, condensed by lens 166 so as to be incident upon image sensor 167. As a result, the document image on document sheet 161 is formed as an image on the sensor surface of image sensor 167, and the image data of the document image is produced by image sensor 167.

Document sheet 161 having passed through the document reading position is discharged by document discharge roller 172 onto paper discharge tray 173.

[Application of Sensorless-Type Brushless DC Motor to Driving Source of Roller]

Figure 26:
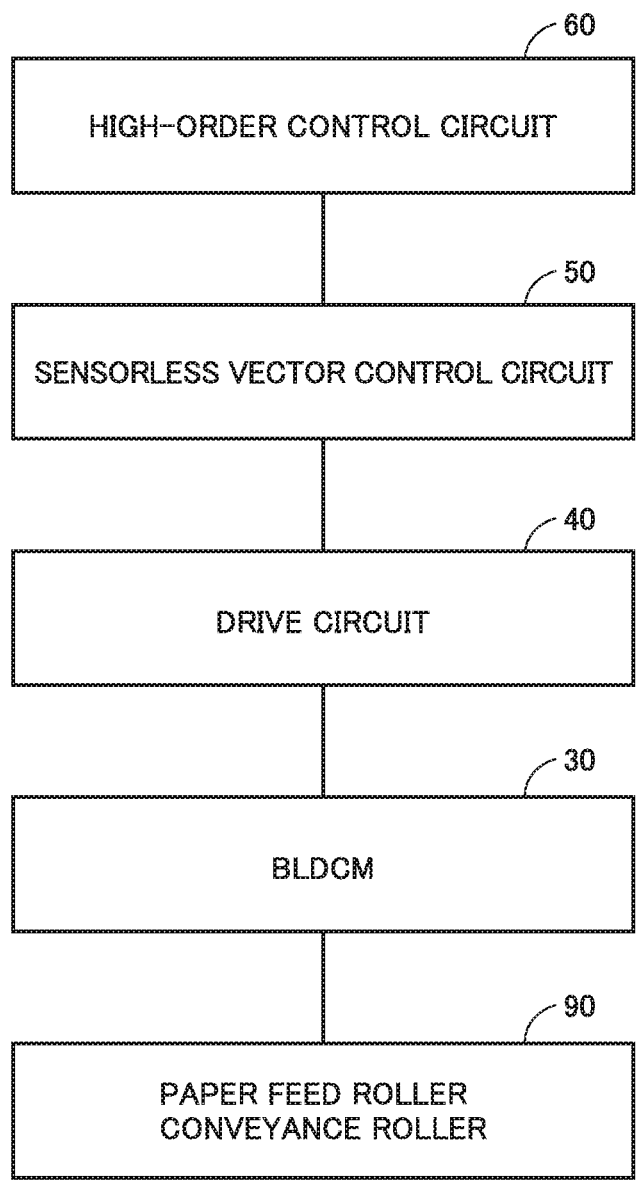
FIG. 26 is a block diagram showing the configuration of: a motor used for controlling driving of a roller of the image forming apparatus; and its control device.

FIG. 26 is a block diagram showing the configuration of: a motor used for controlling driving of a roller of the image forming apparatus; and its control device.

Referring to FIG. 26, various types of rollers 90 forming image forming apparatus 180 are driven by sensorless-type brushless DC motors 30. As described in the first to third embodiments, the motor control device that drive-controls each brushless DC motor 30 includes a drive circuit 40, a sensorless vector control circuit 50, and a high-order control circuit 60.

When sensorless-type brushless DC motor 30 is to be started, estimation of the initial position of the magnetic pole of the rotor performed before starting the motor is performed using an inductive sensing scheme described in the first to third embodiments.

In this case, it should be noted that a commonly used method of pulling a rotor cannot be used as an initial magnetic pole position estimating method particularly for the motors for driving paper feed rollers 141, 143 and 170 and timing roller 145 among the motors used in image forming apparatus 180. This is because pulling of the rotor causes a sheet of paper as recording medium 183 to be also moved together, which may cause jamming in the case of paper feed rollers 141, 143 and 170, and which may lead to difficulty in achieving accurate timing control in the case of timing roller 145.

Furthermore, the brushless DC motors that drive paper feed rollers 141, 143, 170 and timing roller 145 as described above are repeatedly started and stopped at frequent intervals. For this reason, the initial magnetic pole position needs to be estimated in a short time period. According to the motor control device in each of the first to third embodiments, in contrast to the conventional technique, the influence of residual magnetism can be reduced when estimating the initial magnetic pole position without requiring application of the pulse voltage for reducing residual magnetism at each energizing electrical angle. Accordingly, the time period required to estimate the initial magnetic pole position can be shortened while the initial magnetic pole position can be estimated with high accuracy.

Although embodiments of the present invention have been described and illustrated in detail, the disclosed embodiments are made for purposes of illustration and example only and not limitation. The scope of the present invention should be interpreted by terms of the appended claims.

What is claimed is:

1. A motor control device that controls a three-phase motor of a sensorless-type, the motor control device comprising:
a drive circuit that applies a voltage to each phase of a stator winding of the three-phase motor; and
a control circuit that controls the drive circuit,
wherein:
when the control circuit estimates an initial position of a magnetic pole of a rotor of the three-phase motor using an inductive sensing scheme, the control circuit causes the drive circuit to apply a voltage to the stator winding at each of L electrical angles different from one another while changing the L electrical angles, wherein L is an integer equal to or greater than 5,
an absolute value of a difference between an electrical angle of the voltage applied to the stator winding at an $i^{th}$ time for initial position estimation and an electrical angle of the voltage applied to the stator winding at an $(i-1)^{th}$ time for the initial position estimation is equal to or greater than 180-360/L degrees and equal to or less than 180+360/L degrees, wherein i is an integer equal to or greater than 2 and equal to or less than L, and
an absolute value of a difference between an electrical angle of the voltage applied to the stator winding at a $1^{st}$ time for the initial position estimation and an electrical angle of the voltage applied to the stator winding at a last time before starting the initial position estimation is equal to or greater than 180-360/L degrees and equal to or less than 180+360/L degrees.

2. The motor control device according to claim 1, wherein:
the control circuit performs the initial position estimation in response to a start command for the three-phase motor, and
a timing of applying the voltage to the stator winding at the last time before starting the initial position estimation occurs before the control circuit receives the start command.

3. The motor control device according to claim 2, wherein:
when the control circuit controls the drive circuit to stop the three-phase motor while gradually reducing a rotation speed of the three-phase motor, the control circuit stores a hold angle at a time when the rotor is stopped, and
the electrical angle of the voltage applied to the stator winding at the last time before starting the initial position estimation is the hold angle.

4. The motor control device according to claim 2, wherein:
when the control circuit controls the drive circuit to stop the three-phase motor by brake control or free run, the control circuit causes the drive circuit to apply a voltage to the stator winding at a first electrical angle after the rotor is stopped, wherein the voltage has a magnitude sufficient to prevent the rotor from rotating, and
the electrical angle of the voltage applied to the stator winding at the last time before starting the initial position estimation is the first electrical angle.

5. The motor control device according to claim 2, wherein:
after power supply for operation is started, the control circuit causes the drive circuit to apply a voltage to the stator winding at a first electrical angle, wherein the voltage has a magnitude sufficient to prevent the rotor from rotating, and
the electrical angle of the voltage applied to the stator winding at the last time before starting the initial position estimation is the first electrical angle.

6. The motor control device according to claim 1, wherein:
for the initial position estimation, the control circuit obtains a detection value of a current of the stator winding, wherein the current is generated by voltage application to the stator winding, and
in accordance with a difference between an electrical angle of the voltage applied at a $k^{th}$ time for the initial position estimation and an electrical angle of the voltage applied at a $(k-1)^{th}$ time for the initial position estimation, the control circuit determines whether to correct the detection value of the current of the stator winding, wherein the current is based on voltage application at the $k^{th}$ time, and k is an integer equal to or greater than 2 and equal to or less than L.

7. The motor control device according to claim 6, wherein:
- when an absolute value of a difference between the electrical angle of the voltage applied at the $k^{th}$ time for the initial position estimation and the electrical angle of the voltage applied at the $(k-1)^{th}$ time for the initial position estimation is not 180 degrees, the control circuit corrects the detection value of the current of the stator winding, wherein the current is generated by voltage application at the $k^{th}$ time, and
- when the absolute value of the difference between the electrical angle of the voltage applied at the $k^{th}$ time and the electrical angle of the voltage applied at the $(k-1)^{th}$ time is 180 degrees, the control circuit does not correct the detection value of the current of the stator winding, wherein the current is generated by voltage application at the $k^{th}$ time.

8. The motor control device according to claim 1, wherein:
- the voltage applied to each phase of the stator winding at the $i^{th}$ time for the initial position estimation and the voltage applied to a corresponding phase of the stator winding at the $(i-1)^{th}$ time for the initial position estimation are different in polarity from each other, or at least one of the voltages is zero, and
- the voltage applied to each phase of the stator winding at the $1^{st}$ time for the initial position estimation and the voltage applied to a corresponding phase of the stator winding at the last time before starting the initial position estimation are different in polarity from each other, or at least one of the voltages is zero.

9. The motor control device according to claim 8, wherein when a voltage applied at a $j^{th}$ time to one of phases of the stator winding for the initial position estimation is zero, a voltage applied at a $(j-1)^{th}$ time and a voltage applied at a $(j+1)^{th}$ time are opposite in polarity to each other, wherein j is an integer equal to or greater than 2 and equal to or less than L−1.

10. An image forming apparatus comprising:
- a paper feed roller that takes out a sheet of paper, and a conveyance roller that conveys the sheet of paper taken out;
- a printer that forms an image on the conveyed sheet of paper; and
- a motor control device that controls at least one of three-phase motors for driving the paper feed roller and the conveyance roller, each of the three-phase motors being of a sensorless type,
- wherein:
- the motor control device includes:
  - a drive circuit that applies a voltage to each phase of a stator winding of each of the three-phase motors; and
  - a control circuit that controls the drive circuit,
- when the control circuit estimates an initial position of a magnetic pole of a rotor of each of the three-phase motors using an inductive sensing scheme, the control circuit causes the drive circuit to apply a voltage to the stator winding at each of L electrical angles different from one another while changing the L electrical angles, wherein L is an integer equal to or greater than 5,
- an absolute value of a difference between an electrical angle of the voltage applied to the stator winding at an $i^{th}$ time for initial position estimation and an electrical angle of the voltage applied to the stator winding at an $(i-1)^{th}$ time for the initial position estimation is equal to or greater than 180-360/L degrees and equal to or less than 180+360/L degrees, wherein i is an integer equal to or greater than 2 and equal to or less than L, and
- an absolute value of a difference between an electrical angle of the voltage applied to the stator winding at a $1^{st}$ time for the initial position estimation and an electrical angle of the voltage applied to the stator winding at a last time before starting the initial position estimation is equal to or greater than 180-360/L degrees and equal to or less than 180+360/L degrees.

11. A method for estimating an initial position of a magnetic pole of a rotor of a three-phase motor that is of a sensorless-type, the method comprising:
- causing a drive circuit to apply a voltage to each phase of a stator winding at each of L electric angles different from one another while changing the L electrical angles, and at a voltage value and for an energization time period, wherein the voltage value and the energization time period are set such that rotor does not rotate, and L is an integer equal to or greater than 5;
- causing a current detection circuit to detect a current flowing through each phase of the stator winding due to the application of the voltage; and
- estimating the initial position of the magnetic pole of the rotor based on a peak value of the current detected at each of the L electric angles,
- wherein:
- an absolute value of a difference between an electrical angle of the voltage applied to the stator winding at an $i^{th}$ time for initial position estimation and an electrical angle of the voltage applied to the stator winding at an $(i-1)^{th}$ time for the initial position estimation is equal to or greater than 180-360/L degrees and equal to or less than 180+360/L degrees, wherein i is an integer equal to or greater than 2 and equal to or less than L, and
- an absolute value of a difference between an electrical angle of the voltage applied to the stator winding at a $1^{st}$ time for the initial position estimation and an electrical angle of the voltage applied to the stator winding at a last time before starting the initial position estimation is equal to or greater than 180-360/L degrees and equal to or less than 180+360/L degrees.

12. The method according to claim 11, further comprising receiving a start command for the three-phase motor, wherein:
- a timing of applying the voltage to the stator winding at the $1^{st}$ time for the initial position estimation occurs after receiving the start command, and
- a timing of applying the voltage to the stator winding at the last time before starting the initial position estimation occurs before receiving the start command.

13. The method according to claim 12, further comprising:
- controlling the drive circuit to stop the three-phase motor while gradually reducing a rotation speed of the three-phase motor; and
- storing a hold angle at a time when the rotor is stopped, wherein the electrical angle of the voltage applied to the stator winding at the last time before starting the initial position estimation is the hold angle.

14. The method according to claim 12, further comprising:
- controlling the drive circuit to stop the three-phase motor by brake control or free run; and
- causing the drive circuit to apply a voltage to the stator winding at a first electrical angle after the rotor is stopped, the voltage having a magnitude sufficient to prevent the rotor from rotating, wherein the electrical angle of the voltage applied to the stator winding at the last time before starting the initial position estimation is the first electrical angle.

15. The method according to claim 12, further comprising:
causing the drive circuit to apply a voltage to the stator winding at a first electrical angle after power supply for operation is started, the voltage having a magnitude sufficient to prevent the rotor from rotating,
wherein the electrical angle of the voltage applied to the stator winding at the last time before starting the initial position estimation is the first electrical angle.

16. The method according to claim 11, further comprising, in accordance with a difference between an electrical angle of the voltage applied at a $k^{th}$ time for the initial position estimation and an electrical angle of the voltage applied at a $(k-1)^{th}$ time for the initial position estimation, determining whether to correct a detection value of the current flowing through the stator winding due to voltage application at the $k^{th}$ time, wherein k is an integer equal to or greater than 2 and equal to or less than L.

17. The method according to claim 16, wherein an absolute value of a difference between the electrical angle of the voltage applied at the $k^{th}$ time for the initial position estimation and the electrical angle of the voltage applied at the $(k-1)^{th}$ time for the initial position estimation is not 180 degrees, and the correcting of the detection value of the current flowing through the stator winding is performed.

18. The method according to claim 16, wherein the absolute value of the difference between the electrical angle of the voltage applied at the $k^{th}$ time and the electrical angle of the voltage applied at the $(k-1)^{th}$ time is 180 degrees, and the correcting of the detection value of the current flowing through the stator winding is not performed.

19. The method according to claim 11, wherein:
the voltage applied to each phase of the stator winding at the $i^{th}$ time for the initial position estimation and the voltage applied to a corresponding phase of the stator winding at the $(i-1)^{th}$ time for the initial position estimation are different in polarity from each other, or at least one of the voltages is zero, and
the voltage applied to each phase of the stator winding at the $1^{st}$ time for the initial position estimation and the voltage applied to a corresponding phase of the stator winding at the last time before starting the initial position estimation are different in polarity from each other, or at least one of the voltages is zero.

20. The method according to claim 19, wherein a voltage applied at a $j^{th}$ time to one of phases of the stator winding for the initial position estimation is zero, a voltage applied at a $(j-1)^{th}$ time to the phase of the stator winding and a voltage applied at a $(j+1)^{th}$ time to the phase of the stator winding are opposite in polarity to each other, and j is an integer equal to or greater than 2 and equal to or less than L-1.

* * * * *